Feb. 27, 1923.
C. E. WHITE
1,446,605
MOTOR PROPELLED VEHICLE
Filed Apr. 29, 1918   15 sheets-sheet 3
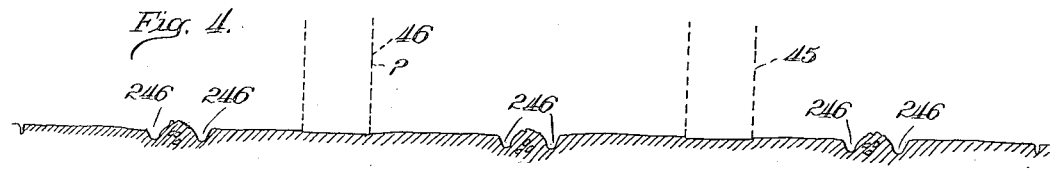
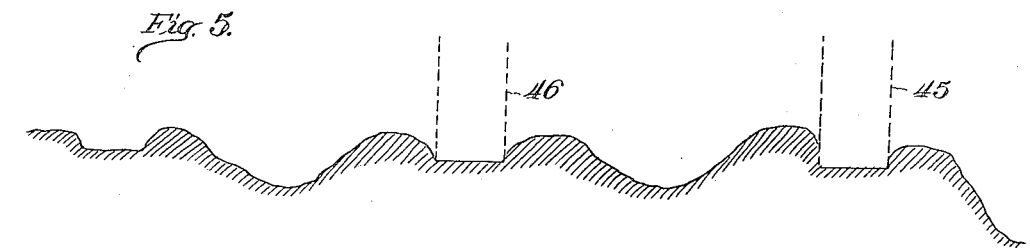
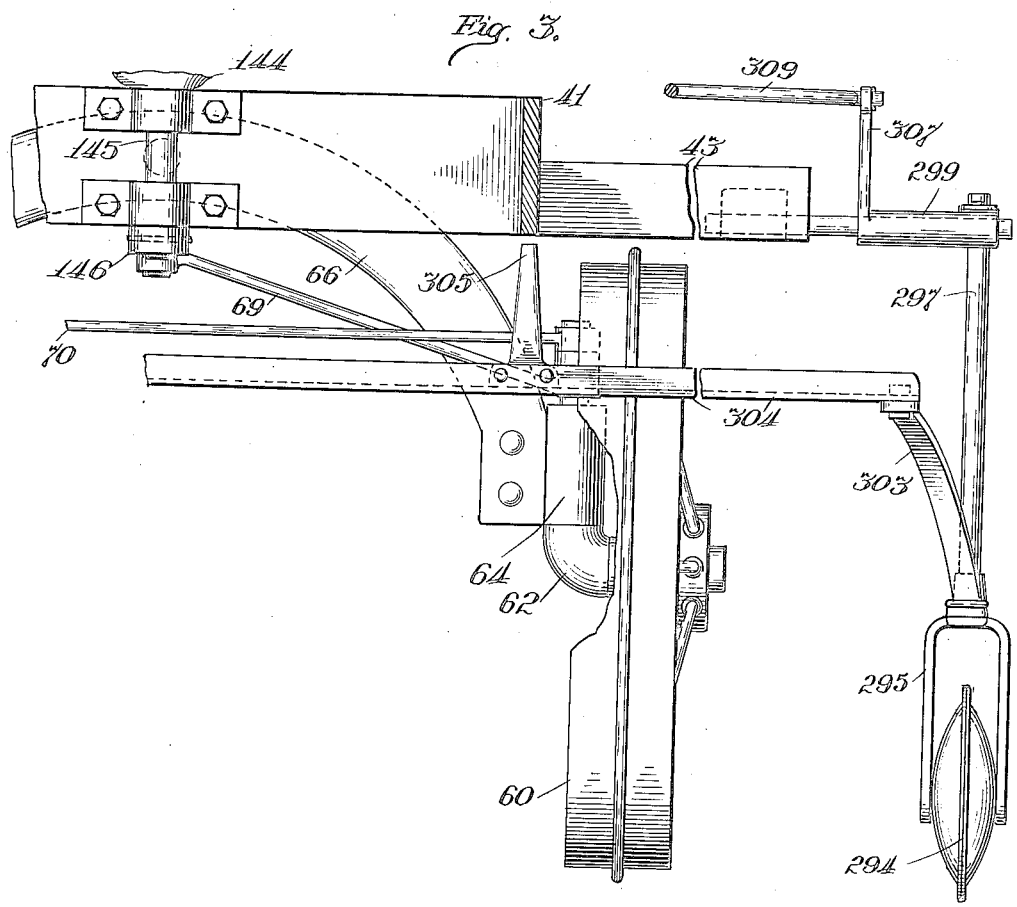
Inventor
Charles E. White,
Attorneys

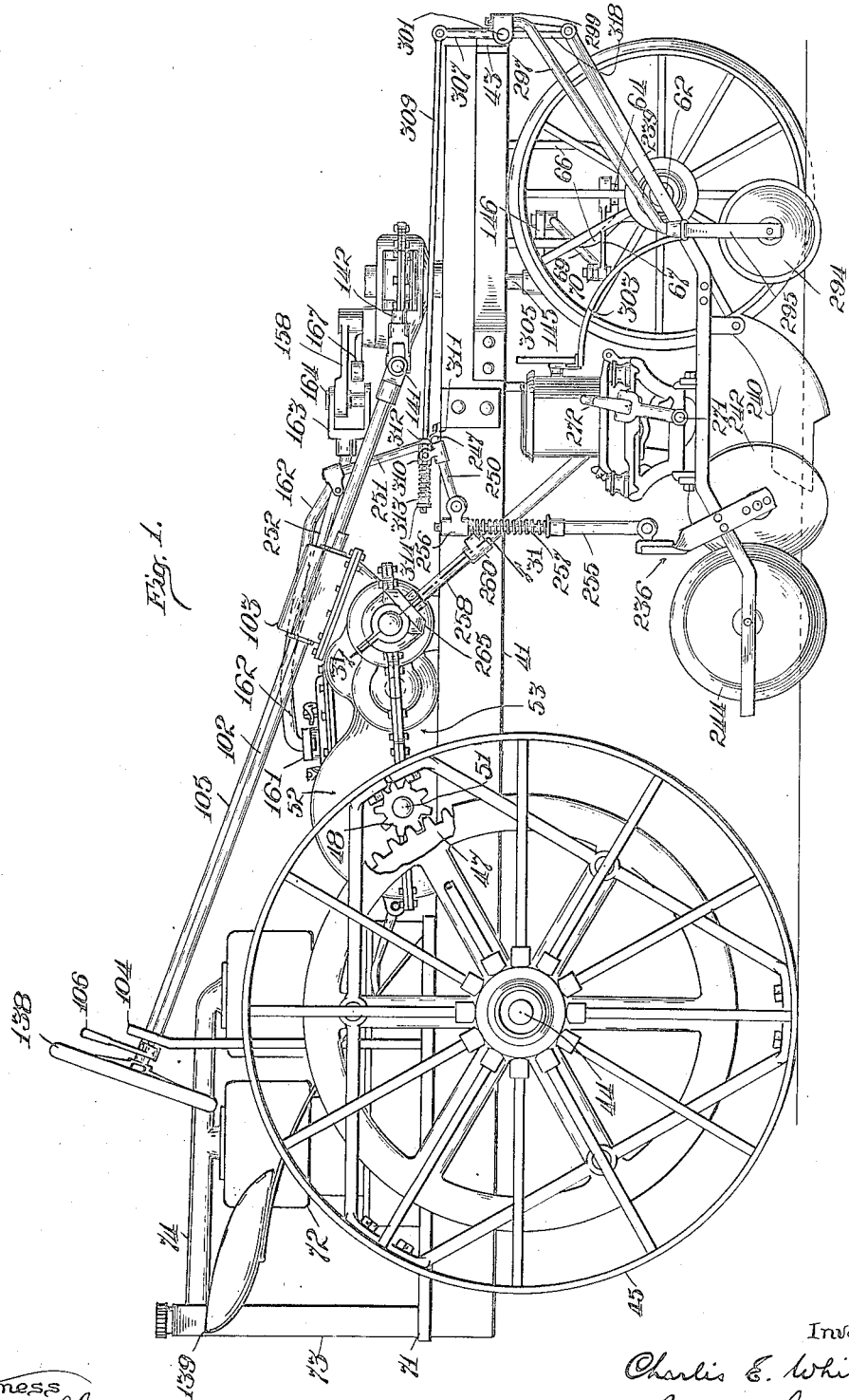

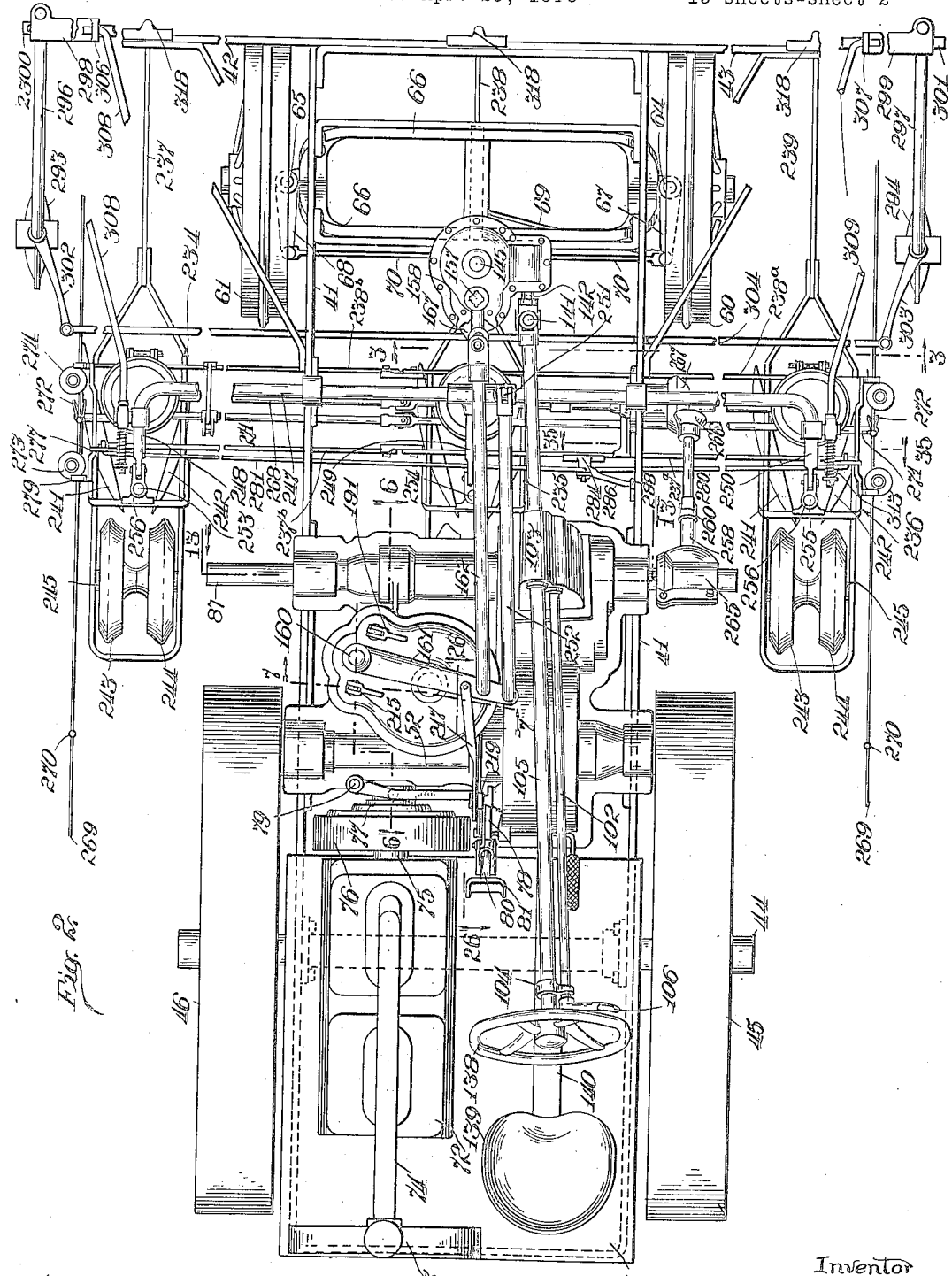

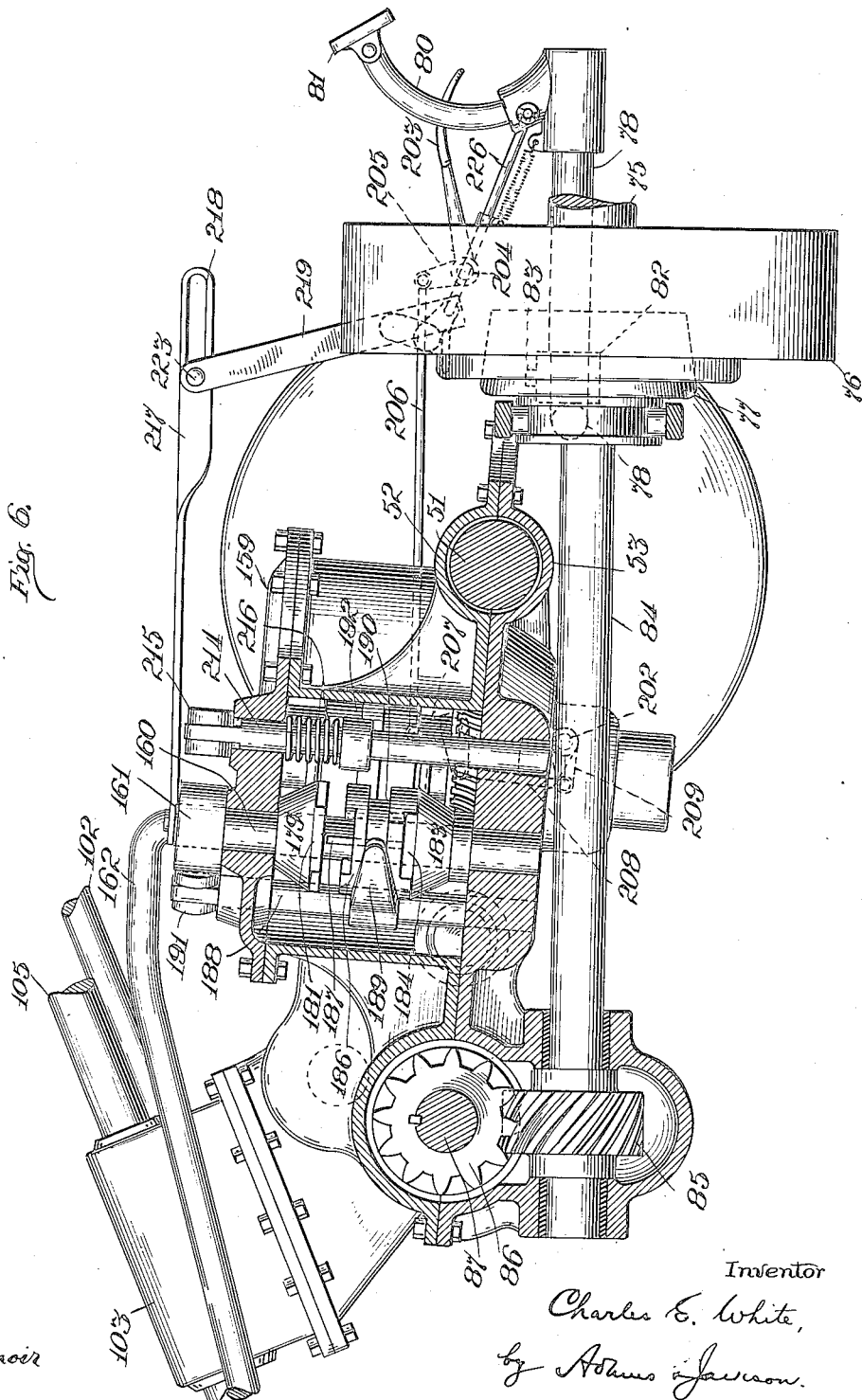

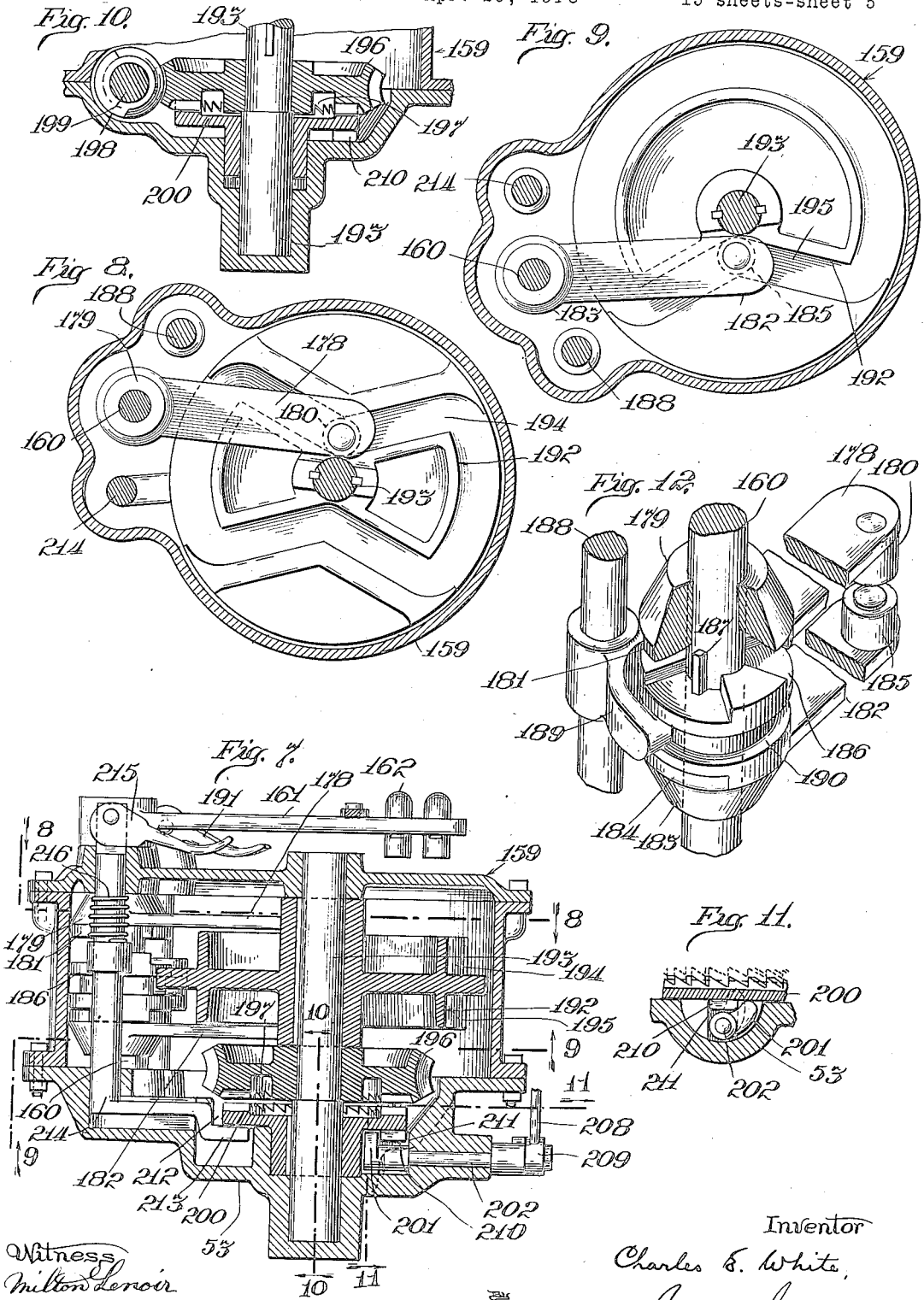

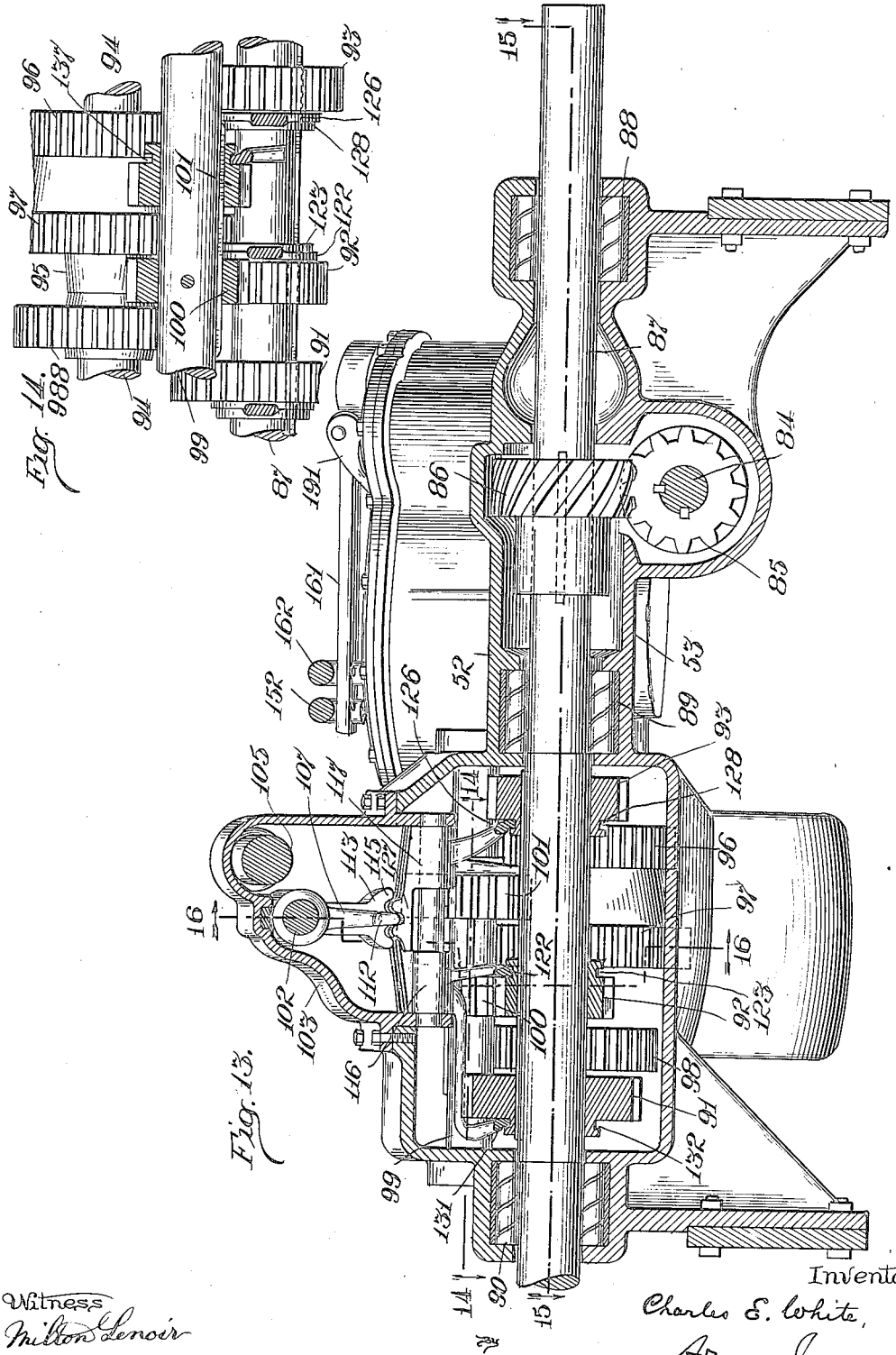

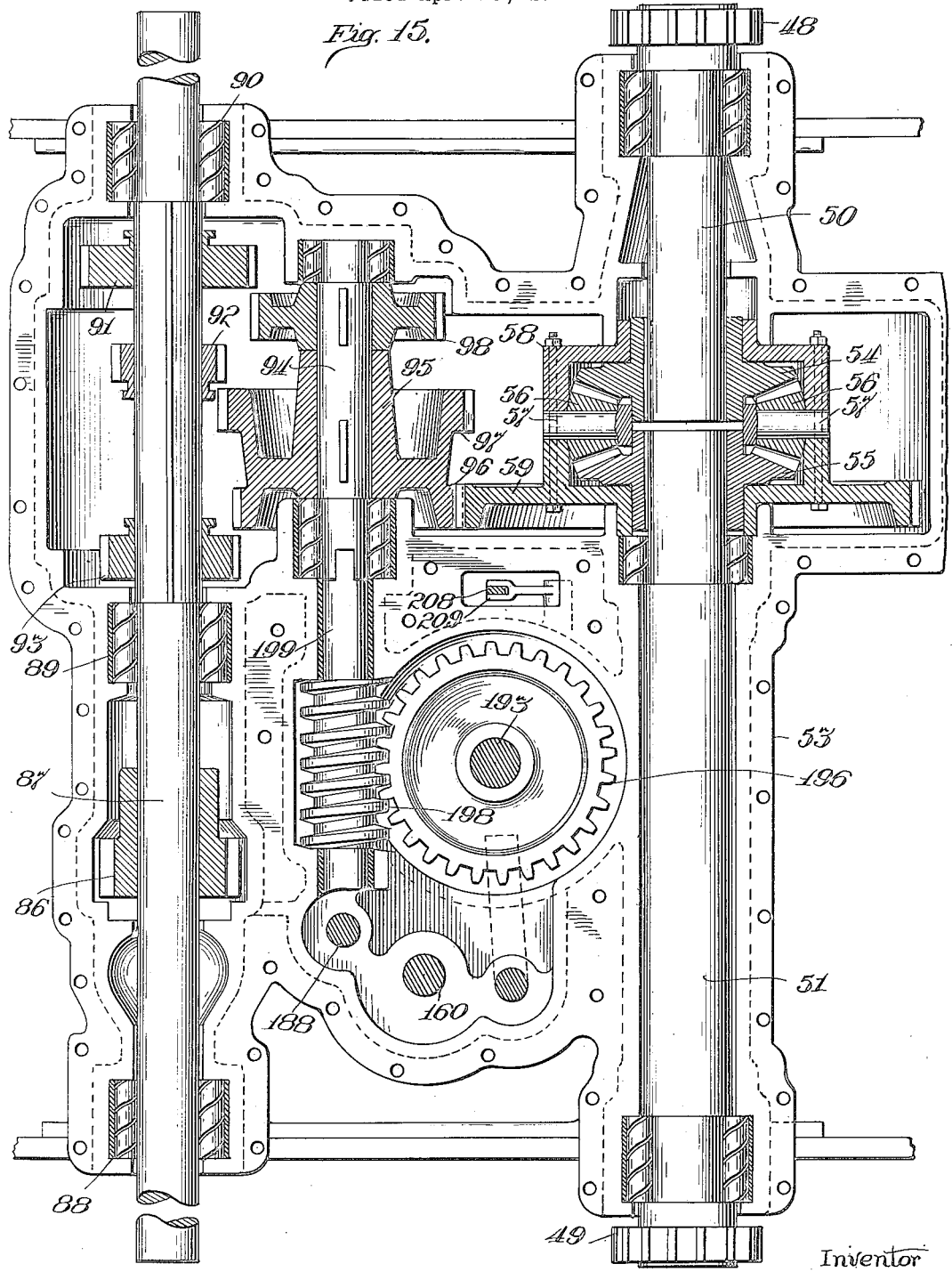

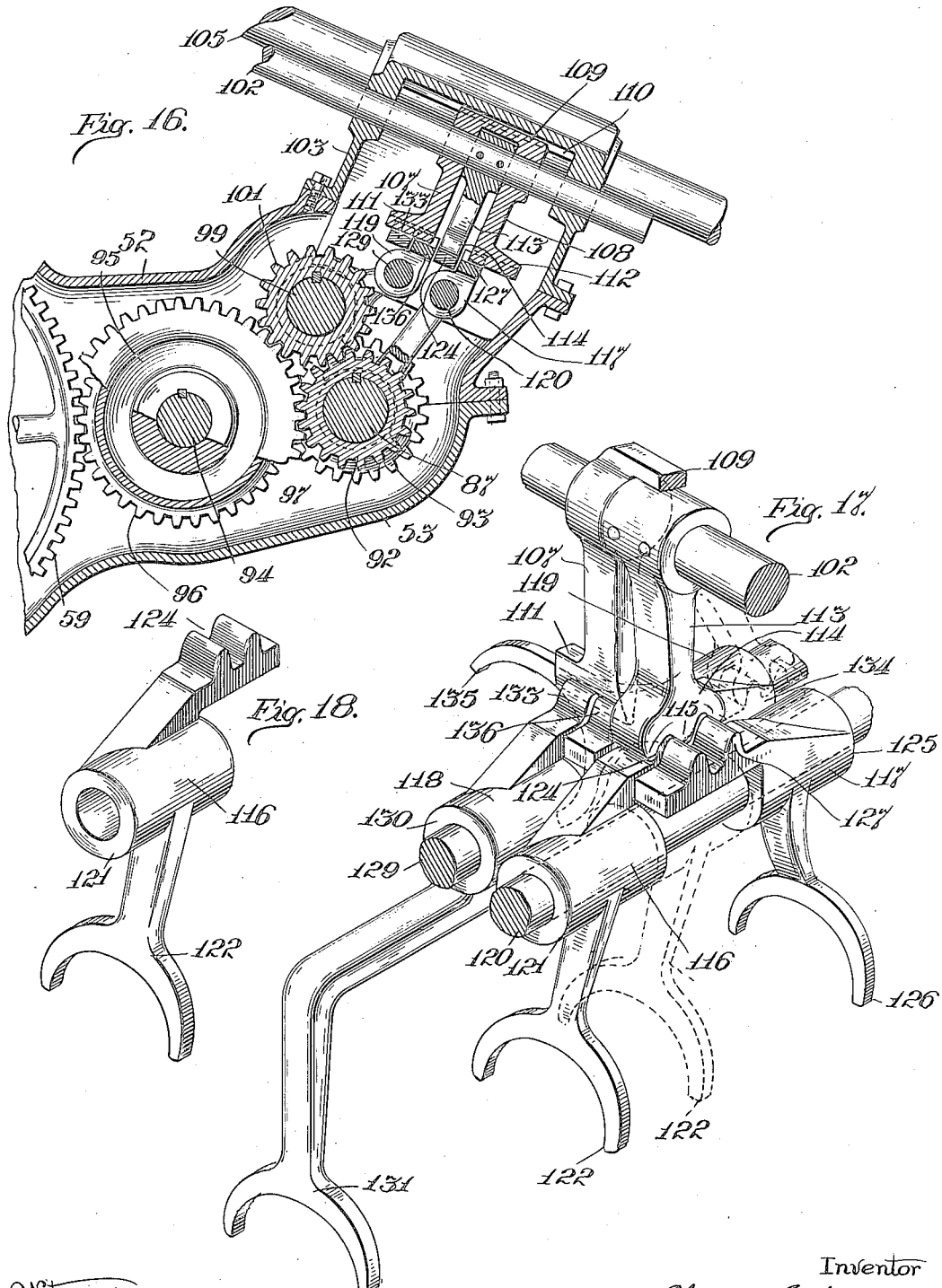

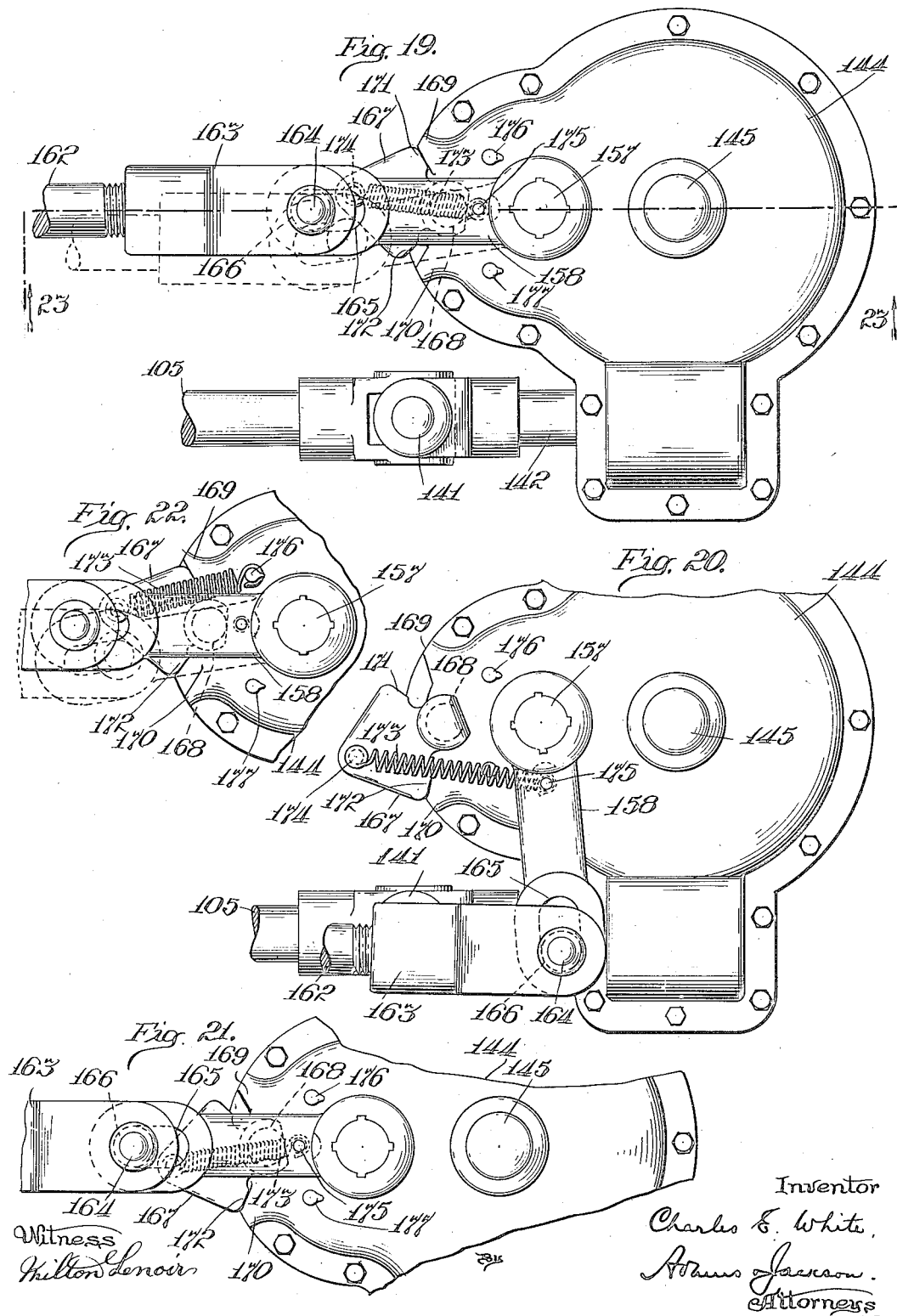

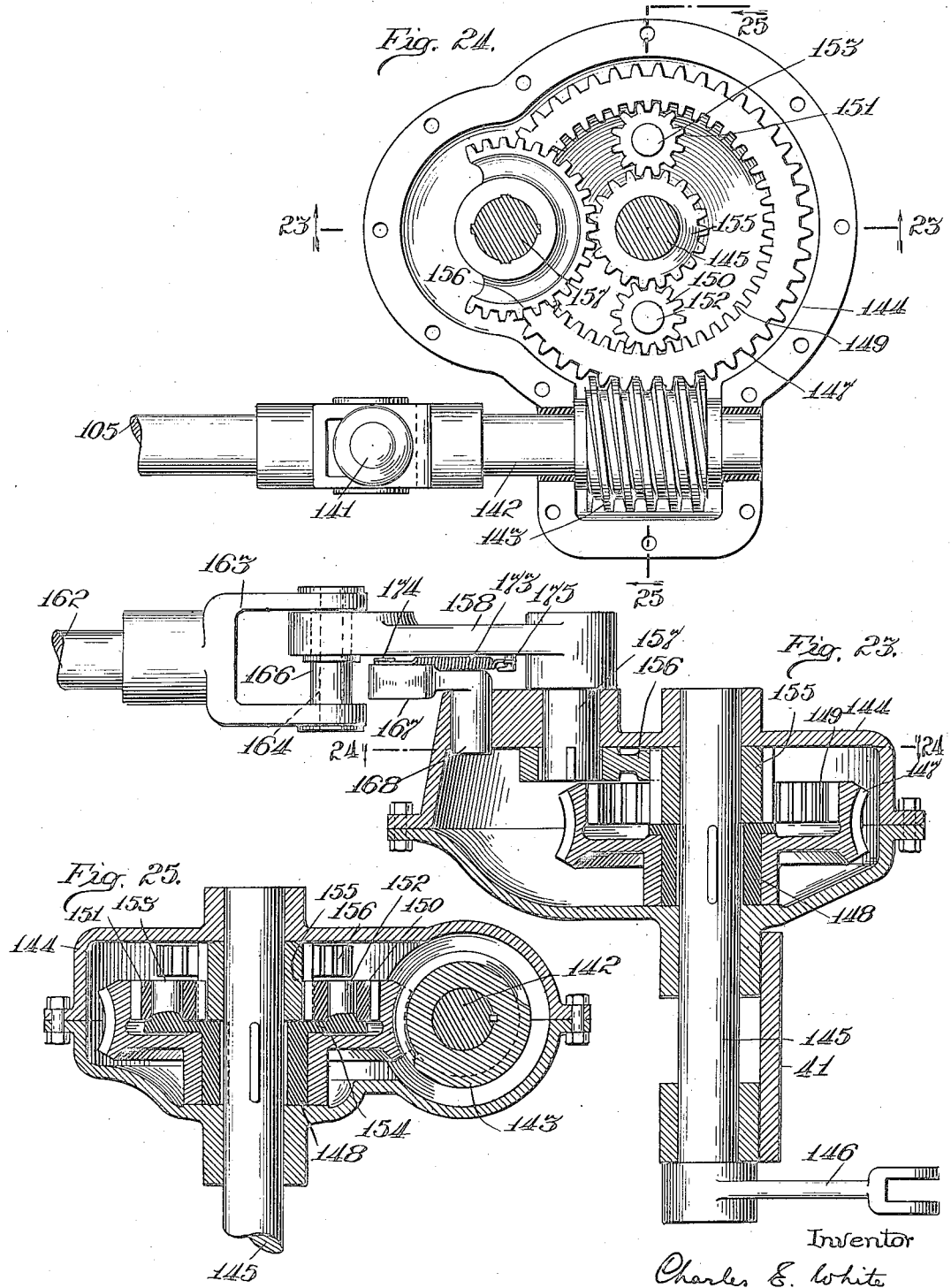

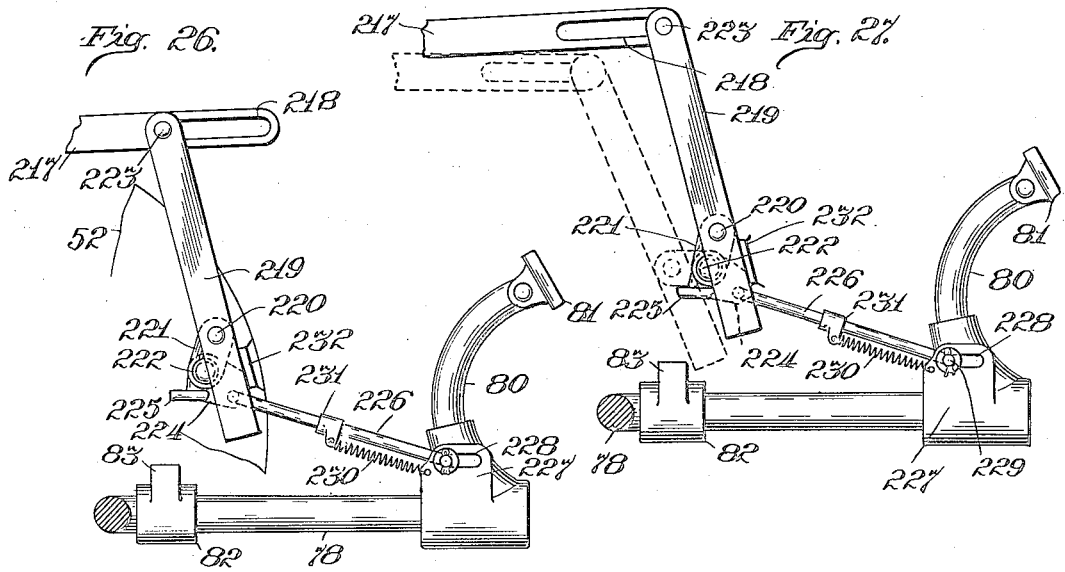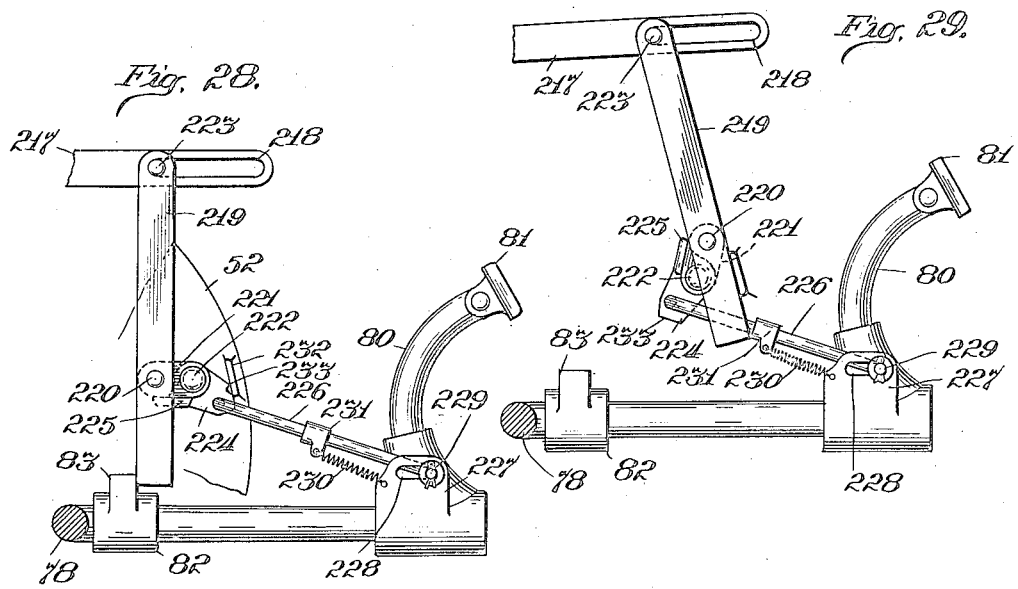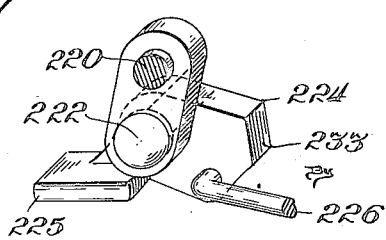

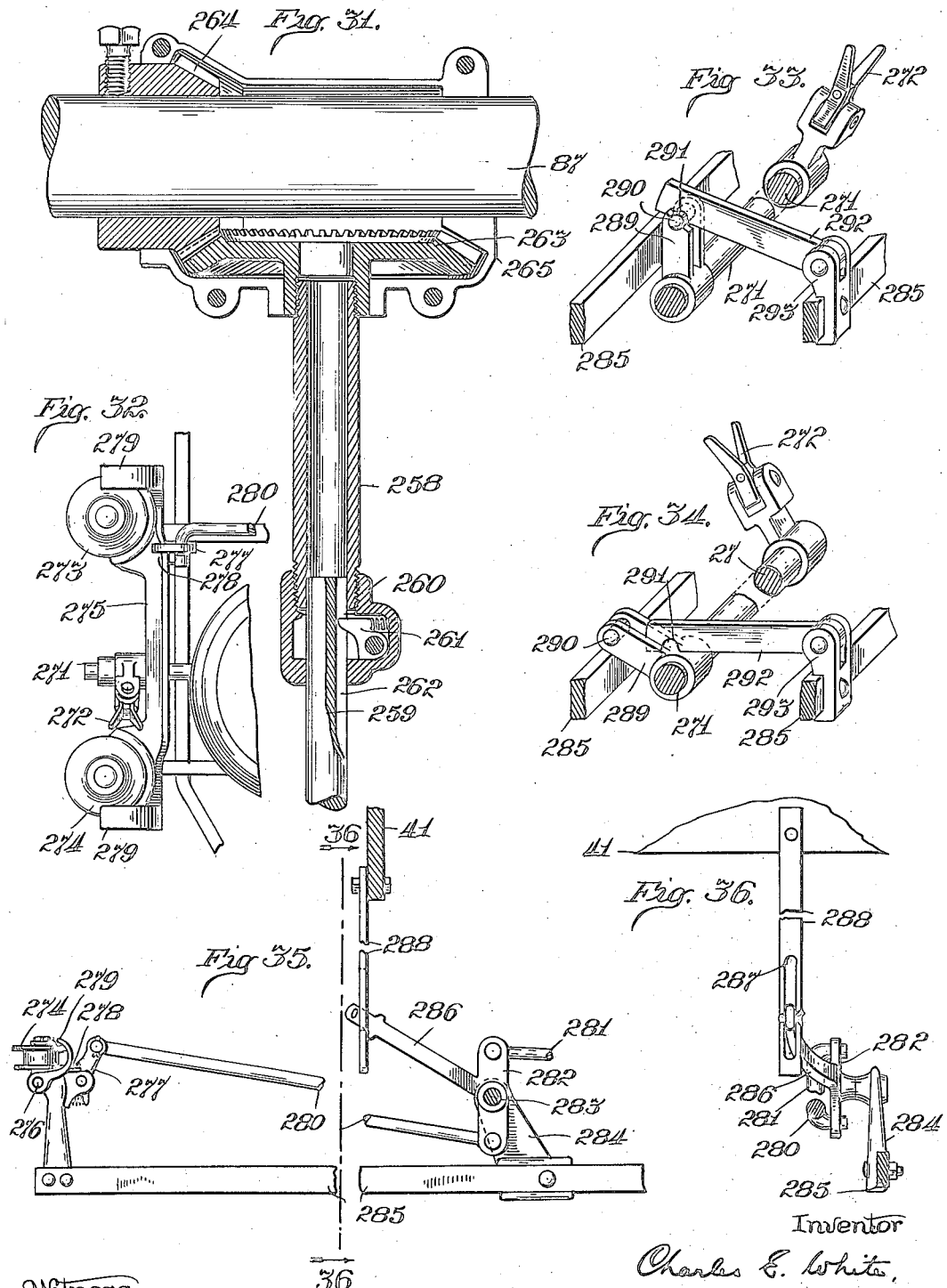

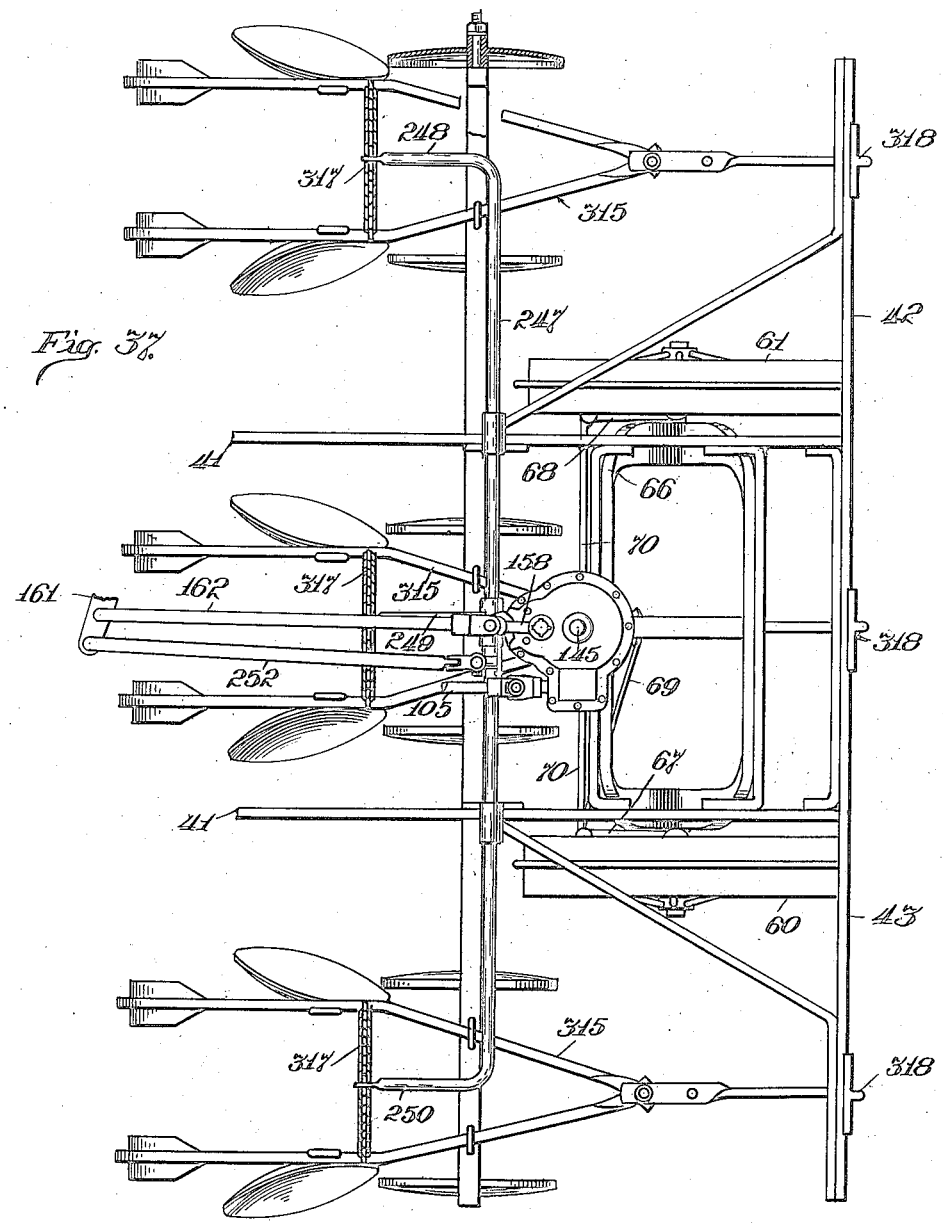

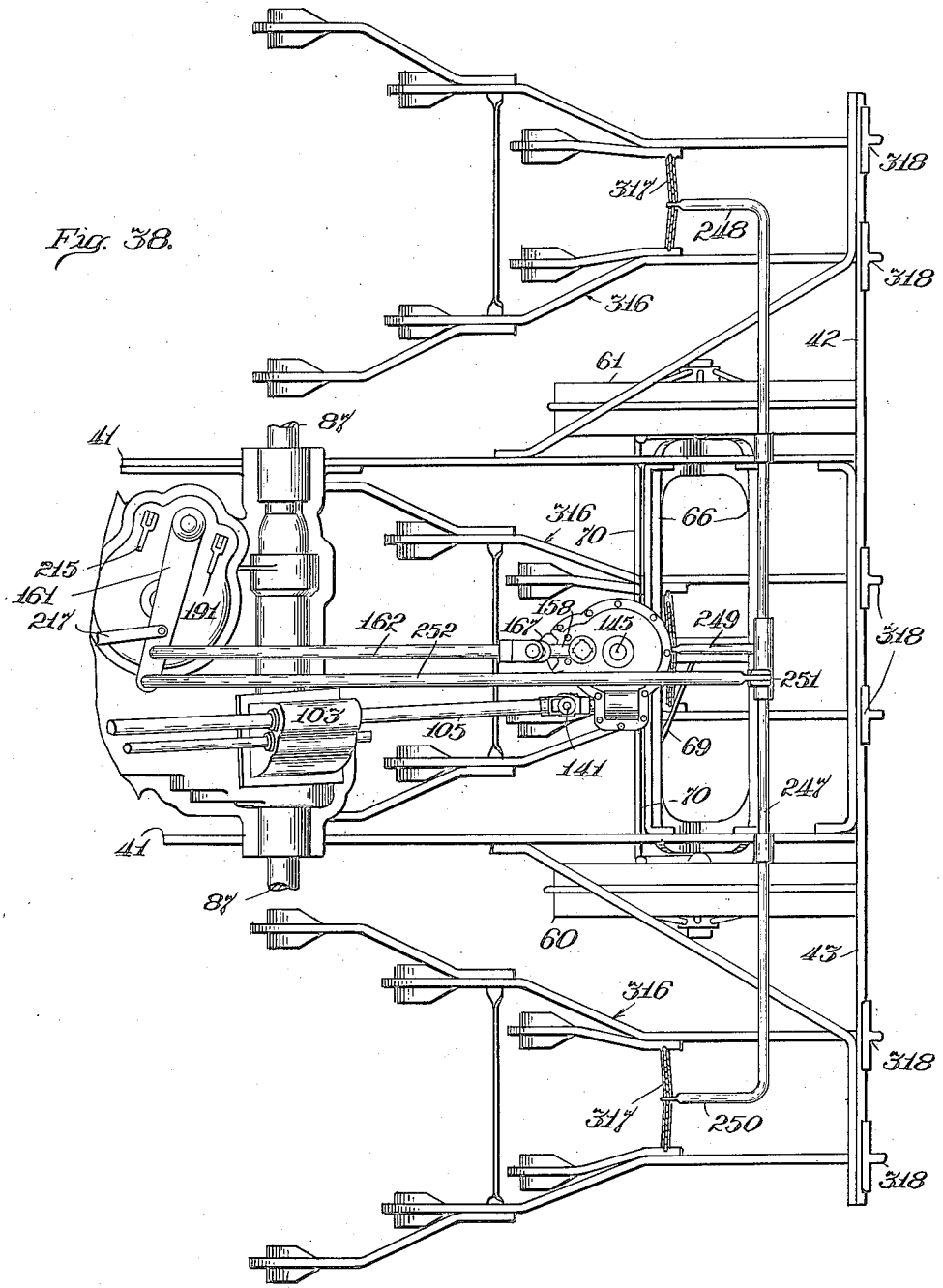

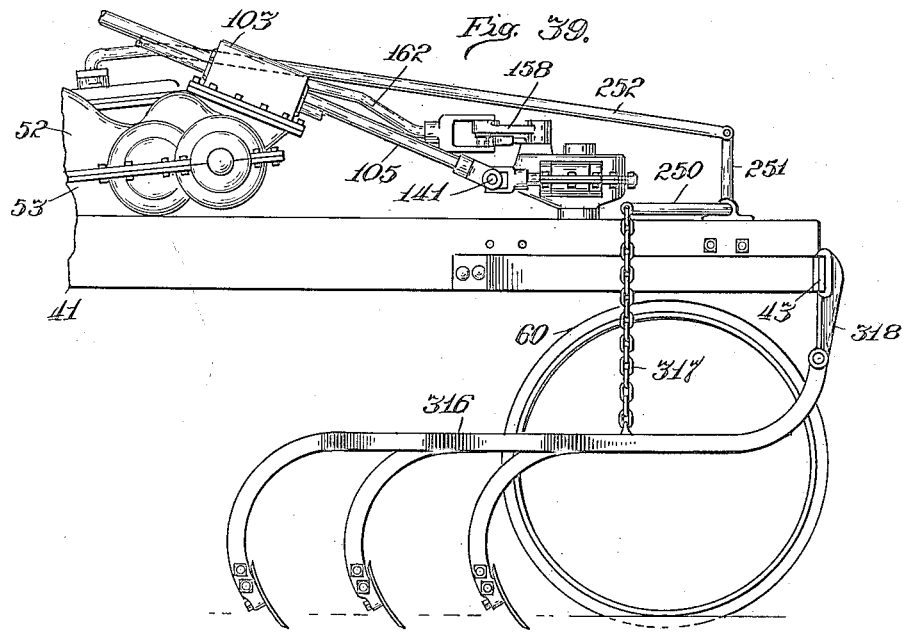
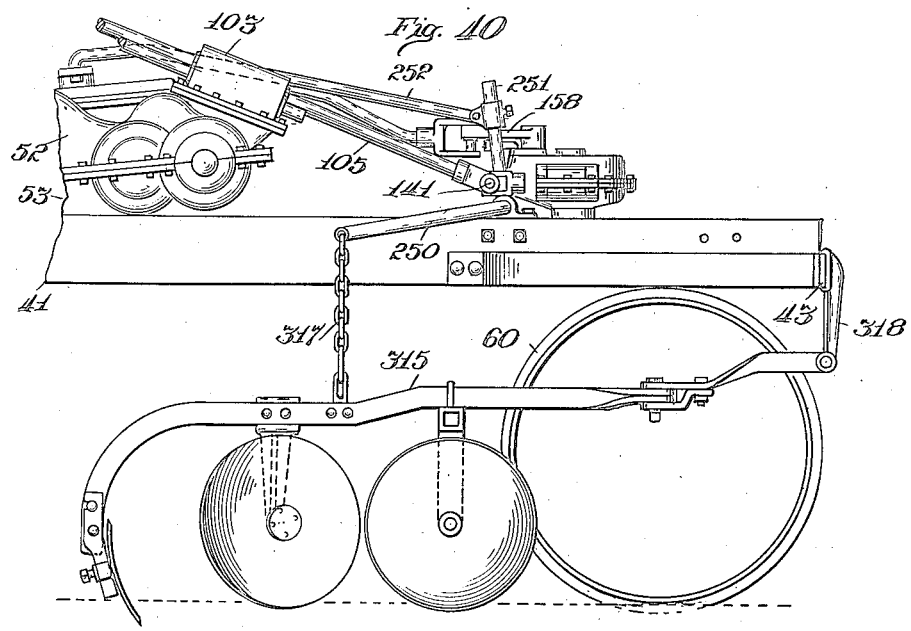

Patented Feb. 27, 1923.

1,446,605

UNITED STATES PATENT OFFICE.

CHARLES E. WHITE, OF MOLINE, ILLINOIS.

MOTOR-PROPELLED VEHICLE.

Application filed April 29, 1918. Serial No. 231,432.

*To all whom it may concern:*

Be it known that I, CHARLES E. WHITE, a citizen of the United States, and a resident of Moline, in the county of Rock Island and State of Illinois, have invented certain new and useful Improvements in Motor-Propelled Vehicles, of which the following is a specification, reference being had to the accompanying drawings.

My invention relates to motor propelled vehicles suitable for use with agricultural implements such as corn planters, cultivators, &c.

The principal objects of my invention are:—(a) To provide an improved frame having power driven traction wheels at the rear and dirigible supporting wheels at the front, said frame being constructed and arranged for the application thereto of a variety of soil tilling implements such as corn or other seed planters, cultivators, &c., as well as other implements, such as harvesters, which perform no soil tilling function; (b) to provide an improved motor propelled vehicle or implement having dirigible wheels with power-operated means for operating such dirigible wheels to steer the machine, and particularly for making turns at the ends of rows; (c) to provide mechanism for automatically controlling the turning of the machine at the end of a row whether the direction of travel of the machine be reversed to turn it back along a parallel row or it be turned ninety degrees to travel at right angles to a previous row; (d) to provide means for adjusting such steering mechanism so that the machine may automatically be steered to turn either to the right or to the left; (e) as a further refinement of the automatic steering mechanism, to provide means by which the automatically controlled steering mechanism will operate to turn the machine at the ends of the rows alternately to the right and to the left, as is necessary in tilling parallel rows; (f) to provide hand-operated steering mechanism in association with the power operated steering mechanism referred to, constructed and arranged so that the hand-operated steering mechanism may be operated either independently of or in conjunction with the power-operated steering mechanism; (g) to provide means for automatically stopping the machine after a turn has been made, when desired; (h) to provide improved mechanism for driving the machine forward at different speeds and for reversing the direction of travel of the traction wheels; (i) to provide improved means for mounting the front wheels by which the machine when used for cultivating will clear the corn even after it attains considerable height; (j) to provide a frame structure of the type described, constructed and arranged so that the hitch of the tillage implements will be low while at the same time the frame will be high enough to clear the plants; (k) to provide an improved tractor propelled implement of the character described in which the weight of the motor and transmission mechanism will be approximately balanced with respect to the opposite sides of the machine; and (l) to provide various other improvements which will be pointed out in the course of the description of the machine illustrated in the accompanying drawings.

In the accompanying drawings, which illustrate a machine embodying the several improvements hereinbefore pointed out as objects of my invention,—

Fig. 1 is a side elevation of the entire machine, showing it arranged for use as a corn planter;

Fig. 2 is a plan view thereof, parts of the front portion of the frame being broken away intermediately;

Fig. 3 is a partial transverse vertical section on line 3—3 of Fig. 2, enlarged, showing the front arch which carries the dirigible front wheels, and parts of the guiding devices;

Fig. 4 is a view showing the relation of the wheels to the hills in planting corn with a corn planter of the standard type, but equipped with my improved presser wheels;

Fig. 5 is a view illustrating the position of the wheels with reference to the corn rows where the corn is listed;

Fig. 6 is an enlarged detail, being a partial vertical section on line 6—6 of Fig. 2 illustrating part of the automatic steering mechanism and parts of the power transmission mechanism by which the traction wheels are driven;

Fig. 7 is a vertical sectional view of part of the automatic steering mechanism taken on line 7—7 of Fig. 2;

Fig. 8 is a horizontal section on line 8—8 of Fig. 7 looking down;

Fig. 9 is a horizontal section on line 9—9 of Fig. 7 looking up;

Fig. 10 is a partial vertical section on line 10—10 of Fig. 7;

Fig. 11 is a partial horizontal section on line 11—11 of Fig. 7;

Fig. 12 is a perspective view, partly broken away, illustrating certain parts of the automatic steering mechanism;

Fig. 13 is a partial transverse vertical section on line 13—13 of Fig. 2, showing the transmission mechanism through which the speed and direction of rotation of the traction wheels are controlled;

Fig. 14 is a partial sectional view on line 14—14 of Fig. 13;

Fig. 15 is a horizontal section on line 15—15 of Fig. 13;

Fig. 16 is a vertical sectional view on line 16—16 of Fig. 13;

Fig. 17 is a perspective view, illustrating the devices for shifting the transmission gears, some parts being in section;

Fig. 18 is a perspective view of one of the gear-shifting members shown in Fig. 17;

Fig. 19 is a plan view of part of the automatic steering mechanism, being that part thereof which is located adjacent to the front wheels;

Figs. 20 and 21 are similar views, showing changed positions of the parts;

Fig. 22 is a partial plan view of the parts shown in Fig. 19, showing the arrangement used when the machine is turned only in one direction;

Fig. 23 is a view partly in vertical section on line 23—23 of Fig. 19, some parts being in elevation;

Fig. 24 is a horizontal section on line 24—24 of Fig. 23;

Fig. 25 is a vertical section on line 25—25 of Fig. 24;

Figs. 26, 27, 28 and 29 are a series of detailed views showing different positions which are assumed by certain parts of the mechanism employed for automatically stopping the machine after it has completed a turn;

Fig. 30 is a perspective view showing certain parts which enter into the structure illustrated in Figs. 26 to 29;

Fig. 31 is an enlarged detail, being a partial section substantially on the diagonal line 31—31 of Fig. 1;

Fig. 32 is a detail, showing in plan a part of one of the check row wire throw-off devices;

Figs. 33 and 34 are perspective views illustrating one of the check row wire forks and the connections therefor;

Fig. 35 is a vertical cross-section, partly broken away, on line 35—35 of Fig. 2;

Fig. 36 is a detail, being a partial vertical section on line 36—36 of Fig. 35;

Fig. 37 is a plan view of the front portion of the frame illustrating the application thereto of one form of cultivating devices;

Fig. 38 is a similar view showing another form of cultivating devices;

Fig. 39 is a side elevation of the construction shown in Fig. 38; and

Fig. 40 is a similar view of the construction shown in Fig. 37.

Referring to the drawings,—41 indicates the main frame of the implement which, as shown in Fig. 2, is rectangular in form and is provided at the front with a cross-bar the ends 42—43 of which project beyond the sides of the frame forming lateral extensions at opposite sides thereof for attachment of certain parts which will be hereinafter pointed out. At the rear portion of said frame is the rear axle 44 upon which are mounted traction wheels 45—46 of any suitable description. Each of said wheels is provided with an annular rack 47 with which mesh pinions 48—49 mounted, respectively, on transversely-disposed jack shafts 50—51, best shown in Figs. 1 and 15. These jack shafts are mounted in suitable bearings in a housing composed of upper and lower members 52—53 and are connected with each other through a differential gearing of any suitable type. In Fig. 15 I have shown a differential gearing comprising bevel gears 54—55 mounted respectively on the jack shafts 50—51, with which mesh bevel pinions 56 mounted on studs 57 which are radially disposed with relation to the axis of the jack shafts. The studs 57 are carried by a differential housing 58 to which is connected a driving gear 59 through which power is applied to rotate the differential housing 58 and through it, and the differential gearing carried by it, the jack shafts. The manner in which the gear 59 is rotated will be hereinafter described. 60—61 indicate the front wheels of the implement, the axles of which, as shown in Figs. 2 and 3, are carried by spindles 62—63 journaled in vertical bearings 64—65, respectively, carried by an arched axle 66. Said axle is preferably bifurcated as shown in Figs. 1 and 2, and as shown in Fig. 3 is pivoted centrally on a pivot 66$^a$ mounted in a suitable cross brace 66$^b$ secured to the front part of the frame 41 so as to rock about a longitudinal axis, as shown in Figs. 2 and 3. The upper ends of the spindles 62—63 are provided with arms 67—68, respectively, which, in the construction shown, extend rearwardly when the front wheels are in alinement with the rear wheels, and are provided with connecting rods 69—70 through which they are connected with steering mechanism which will be hereinafter described, and said front wheels are held in parallelism with each other while they are swung in one direction or the other to steer the machine.

71 indicates a platform provided at the rear portion of the main frame 41, upon which platform is mounted an internal combustion motor 72 of any suitable type. As best shown in Fig. 2, said motor is mounted at one side, preferably the left-hand side, of the center line of the machine for the purpose of offsetting the weight of the transmission mechanism, which, as will be hereinafter described, is located at the right-hand side of the machine. 73 indicates the usual radiator, and 74 the usual water conduit through which the water which cools the engine cylinders flows to the radiator. 75 indicates the crank shaft of the motor 72, and 76 indicates the usual fly wheel, which also forms one of the members of a sliding clutch, the other member of which is indicated by 77 in Fig. 2. 78 indicates a lever for operating the clutch member 77. Said clutch lever is mounted at one end upon a pivot 79 and extends transversely of the machine, its inner end being bent at right angles and extending rearwardly, as best shown in Figs. 26 to 29, where it carries an upwardly projecting arm 80 on which is a pedal 81. 82 indicates a collar which is mounted on the lever 78 and is provided with a lug 83 for a purpose which will be hereinafter described. It will be obvious that by pressing forward on the pedal 81 the lever 78 will be swung in that direction, thereby moving the clutch member 77 out of engagement with the clutch member 76.

84 indicates a propeller shaft which is in alinement with the crank shaft 75 and carries the clutch member 77 which is free to slide longitudinally of the propeller shaft in the usual way so that it may be moved thereupon into and out of operative engagement with the clutch member 76. Keyways or other suitable means are provided for causing the propeller shaft to rotate with the clutch member 77. 85 indicates a spiral gear carried by the propeller shaft 84 near its forward end, as shown in Fig. 6. Said spiral gear meshes with a spiral gear 86 mounted upon a transversely-disposed shaft 87 which, for convenience of description, will be termed the transmission shaft since it not only serves to transmit power to the traction wheels but also to the seed dropping mechanism of the planters hereinafter described, and it may also be provided with pulleys at its ends to drive other machinery. Said shaft is arranged in advance of the power plant and about midway of the length of the implement frame so that ample space is provided for the attachment of implements to the front of said frame, and the driver's view of such implements is clear and substantially unobstructed. 88—89—90 indicate bearings for the transmission shaft 87, as shown in Figs. 13 and 15. 91—92—93 indicate, respectively, high, low and intermediate gears mounted upon the transmission shaft 87 and slidable longitudinally thereof on keyways, as shown in Figs. 13, 14 and 15. 94 indicates a counter-shaft which is mounted in the housing members 52—53 adjacent to the transmission shaft 87, as shown in Fig. 15. Said shaft has keyed to it in fixed position a hub 95 provided with two gear rings 96—97 forming in effect two connected gears of different diameters, as best shown in Fig. 15. The gear ring 96 meshes with the differential gear 59 and is adapted to be engaged by the intermediate speed gear 93 when the latter is moved longitudinally of the shaft 87 to the left from the position shown in Fig. 13. When this engagement occurs it will be obvious that the differential gear 59 will be driven from the shaft 87 through the intermediate speed gear 93 and the gear ring 96. The gear ring 97 is adapted to be engaged by the low speed gear 92 when the latter is moved to the right from the position shown in Fig. 13, and when this occurs the differential gear 59 will be driven at low speed from the shaft 87 through gear 92 and gear ring 97. 98 indicates a gear mounted on the countershaft 94 adjacent to the hub 95 and keyed to said countershaft. Said gear is adapted to be engaged by the high speed gear 91 when the latter is moved to the right from the position shown in Fig. 13, and when this occurs the differential gear 59 will be driven at high speed from the transmission shaft 87 through high speed gear 91, gear 98, countershaft 94 and gear ring 96. I thus provide for driving the jack shafts 50—51 in a forward direction at either of three speeds. In order to drive said jack shafts in a reverse direction I provide a second countershaft 99 mounted in suitable bearings in the upper member 52 of the transmission housing and provided with two pinions 100—101. Pinion 100 is fixedly mounted on the shaft 99 in position to mesh with the low speed gear 92 when the latter is out of operative position, as shown in Fig. 14, and consequently when the low speed gear 92 is out of engagement with the gear ring 97 the countershaft 99 will be driven from said low speed gear by means of the pinion 100. The pinion 101 is mounted in a keyway to slide longitudinally of the countershaft 99 into and out of mesh with the gear ring 97 so that said countershaft may be caused to rotate said gear ring. It will be apparent that when the pinion 101 meshes with the gear ring 97 the differential gear 59 will be rotated in a reverse direction from the transmission shaft 87 through a train of gears comprising the low speed gear 92, pinion 100, countershaft 99, pinion 101 and gear rings 97 and 96.

For the purpose of shifting the several change speed gears to move any desired one of them or the reverse gear into operative position and at the same time locking the idle gears out of operative position, I provide certain mechanism which will now be described. 102 indicates an endwise movable rock-shaft, the lower end of which extends through a housing 103 which is attached to the transmission housing, while its upper end has a bearing in a bracket 104 which also supports a steering shaft 105, as shown in Figs. 1 and 2. At its upper end the shaft 102 is provided with a lever 106 by which it may be rocked as well as moved longitudinally. 107—108 indicate arms mounted upon the rock-shaft 102 within the housing 103, said arms being spaced a short distance apart, and preferably being united by a rib 109, as shown in Fig. 16. The arms 107—108 are loosely mounted on the rock-shaft 102, and the rib 109 is adapted to slide in a groove 110 in the housing 103, as shown in Figs. 13 and 16, so that the arms 107—108 are prevented from rocking but are free to move longitudinally in the groove 110. Preferably the arms 107—108 and the rib 109 are made integral so that they form substantially a U-shaped bracket, as shown in Fig. 16. The arms 107—108 are provided respectively with laterally projecting heads 111—112, as shown in Figs. 16 and 17, the purpose of which will be hereinafter set forth. 113 indicates an arm fixedly mounted on the rock-shaft 102 between the arms 107—108 shown in Fig. 16, so that said arm rocks with the shaft 102. The arm 113 is provided at its lower end with a head 114 having a few teeth 115 on its lower face, as best shown in Fig. 17. The lower faces of the heads 111—112—114 lie in a common plane, as shown in Fig. 16, to permit them to be shifted into engagement with different gear-shifting devices by endwise movement of the rock-shaft 102, as will more clearly hereinafter appear.

The several change speed gears are moved into or out of operative position by means of a series of gear shifting devices 116—117—118—119, which are actuated by the arm 113, the construction of these parts being best shown in Figs. 17 and 18. The gear shifting devices 116—117 which respectively operate the low and intermediate speed gears 92—93 are mounted upon a shaft 120 supported in the housing 103 a short distance below the heads 111—112, as best shown in Fig. 16, said shaft being arranged parallel with the shaft 87 so that when the arm 113 is swung by the rocking of the rock-shaft 102 its lower end moves longitudinally of the shaft 120. The member 116 comprises a sleeve 121 fitted to slide longitudinally upon the shaft 120, a depending fork 122 which is adapted to fit in an annular groove 123 at one side of the low speed gear 92, and a short rack 124 which projects beyond one end of the sleeve 121 and is adapted to be engaged by the teeth 115 on the lower face of the arm 113, as shown in Fig. 17. The member 117 is similar in construction to the member 116, comprising a sleeve 125 fitted upon the shaft 120, a fork 126 and a rack 127. The fork 126 is adapted to engage an annular groove 128 at one side of the intermediate speed gear 93 as shown in Fig. 15. It will be noted that as shown in Fig. 17 the member 117 is oppositely arranged upon the shaft 120 to the member 116 so that their respective racks 124 and 127 overlap sidewise, and their respective sleeves 121 and 125 are normally spaced apart a distance approximately equal to the length of the racks 124—127. The object of this construction is to permit one or the other of said members to be moved longitudinally upon the shaft 120 toward the other member a distance sufficient to carry the speed gears operated by them respectively into operative position. In Fig. 17 the racks 124—127 are shown in alinement with each other with the teeth 115 of the arm 113 in engagement with the rack 124. When the parts are in this position the head 112 of arm 108 will lie in the space between the two teeth of rack 127, as shown in Fig. 16. It will be apparent, therefore, that by rocking shaft 102 to move arm 113 to the right, as indicated by dotted lines in Fig. 17, the member 116 will be moved in the same direction carrying its fork 122 to the position shown in dotted lines in said figure. This will move low speed gear 92 into mesh with gear 97 so that the differential gear 59 will be driven at low speed from the transmission shaft 87. At the same time the member 117 which controls the shifting of the intermediate gear 93, as above stated, will be held against movement by the non-rocking arm 108. If it be desired to drive differential gear 59 at the intermediate or second speed, it is necessary to move gear 93 into mesh with gear 96, as will be clear from an inspection of Fig. 15, thus necessitating a movement of said gear opposite to the above described movement of low speed gear 92. To accomplish this, rock-shaft 102 is moved endwise to carry arm 113 into engagement with rack 127 and move arm 108 out of engagement with said rack. When this has been done the rock-shaft 102 may be rocked in the opposite direction, thereby moving member 117 toward member 116, and through fork 126, carrying gear 93 into operative engagement with the gear 96. When this operation occurs member 116 will be locked against movement by the head 111 of arm 107, which will have been moved into engagement with the teeth of rack 124 by the operation of moving arm 113 into engagement with rack 127. Thus when either member 116 or 117 is actuated to make a gear shift the other member is locked against movement, and consequently there is no danger of moving both gears 92—93 into mesh with their cooperating gears at the same time.

The gear shifting member 118 is similar in construction to the member 116 and is similarly mounted upon a shaft 129 mounted in the housing 103 adjacent to and parallel with the shaft 120, as shown in Figs. 16 and 17. The member 118 comprises a sleeve 130 having a fork 131, which in this case projects beyond one end of the sleeve 130 and is bent intermediately so as to be adapted to engage the groove 132 at one side of the high speed gear 91, as shown in Fig. 15, and a rack 133 disposed similarly to the rack 124 so that it is adapted to be engaged by the head 111 and the teeth 115, as illustrated in Fig. 17. The member 119 which operates the reversing gear 101 is mounted on the shaft 129 in substantially the same way as the member 117 is mounted on the shaft 120. Said member 119 comprises a sleeve 134, a fork 135 which extends laterally from the sleeve 134, and a rack 136 which corresponds with the rack 127. As shown in Fig. 17, the rack 136 lies between the racks 124 and 133. The fork 135 is adapted to engage an annular groove 137 at one side of the reversing gear 101, as shown in Fig. 14. It will be clear from an inspection of Figs. 14 and 15 that the high speed gear 91 and the reversing gear 101 are shifted in opposite directions when going into operative position, that member 118 is moved to the right from its position, as shown in Fig. 17, in moving the high speed gear 91 into engagement with its cooperating gear 98, and that member 119 is moved to the left from its position as shown in said figure to carry reversing gear 101 into engagement with its cooperating gear 97. (See also Fig. 14.) It will also be evident from the illustration of Fig. 17, that by moving shaft 102 endwise arm 113 may be moved into engagement with either of the racks 136 and 133 and that when it engages one or the other of said racks the fork connected with such rack may be moved by rocking shaft 102 to make the appropriate gear shift. It will be noted from Figs. 16 and 17 that the heads 111—112 are somewhat longer than the width of any two of the racks above described, the purpose of which is to enable either of said heads to lock the other three of said racks against movement when the arm 113 is in engagement with one or the other of the outside racks 127 or 133. For example, if the arm 113 were in engagement with the rack 127 the other three racks would be locked in fixed position by the head 111. In like manner, if the arm 113 were in engagement with rack 133 the other three racks would be locked by head 112. When the arm 113 is in engagement with either of the intermediate racks the two heads 111—112 together lock the other three racks in fixed position.

I thus provide a selective gear shifting mechanism by means of which the transmission shaft 87 may readily be connected to drive the differential gear 59 at either of three forward speeds, or in a reverse direction, by the operation of the lever 106, and at the same time lock all the speed gears against operation except the one which is shifted, thereby avoiding danger of gear stripping through the intentional or accidental movement of two of the speed gears into operative position at the same time.

The machine is steered manually by means of a steering wheel 138 mounted on the steering shaft or rod 105, which, as shown in Fig. 2, extends through the housing 103, and, as shown in Figs. 1 and 2, is supported near its upper end by the bracket 104. It is also supported intermediately by the housing 103 through which it extends, being provided with suitable bearings therein. As clearly shown in said figures, the steering rod 105 is mounted in an inclined position at the right hand side of the machine, the steering wheel 138 being placed conveniently within the reach of an operator occupying a seat 139 carried by a seat supporting bar 140 secured to the platform 71. The lower or forward end of the steering rod 105 is connected through a universal joint 141 with a shaft 142 which carries a worm 143, as best shown in Figs. 1, 19 and 24. The worm carrying shaft 142 is mounted in suitable bearings in a housing 144 mounted upon a portion of the frame 41 as shown in Fig. 23. Extending up through said housing is a vertical shaft 145 which at its lower end carries a crank 146 which is connected to the cross-connecting rods 69—70 by which the front wheels are steered, the arrangement being such that by rotating the vertical shaft 145 in one direction or the other the cross-connecting rods 69—70 may be moved endwise in one direction or the other and the steering wheels 60—61 correspondingly turned. The shaft 145 is operatively connected with the worm 143 by means of a worm wheel 147 which is loosely mounted in the housing 144, concentrically with the shaft 145, upon a hub 148 which is itself keyed to the shaft 145, as shown in Figs. 23 and 25. The worm wheel 147 is also provided with internal gear teeth 149 which mesh with two diametrically opposite pinions 150—151 carried on studs 152—153, respectively, rising from a cross-head 154 secured to or formed integral with the hub 148, as best shown in Fig. 25. The pinions 150—151 also mesh with a wide gear wheel 155 which is loosely mounted on the shaft 145 above the hub 148 upon which it rests, as shown in Figs. 23 and 24. The upper portion of the gear 155 extends up beyond the upper margin of the worm wheel 147, as shown in Figs. 23 and 25. 156 indicates a segmental rack which meshes with the upwardly extending portion of the gear 155, as shown in Figs. 24 and 25, and is carried at the lower end of a shaft 157 mounted in the upper portion of the housing 144. At its upper end the shaft 157 carries a horizontal arm 158 which forms a connection through which the automatic steering of the machine is effected, as will be hereinafter described.

It will be apparent from the foregoing description that when the worm carrying shaft 142 is rotated by means of the steering wheel the rotation of the worm 143 will rotate worm wheel 147 and will tend to rotate pinions 150—151. This will also tend to rotate gear 155, but if such gear be held against rotation by the segmental rack 156, as would be the case when the automatic steering mechanism is not operating to steer the machine, the pinions 150—151 would be caused to travel around the gear 155 thereby rotating the cross-head 154. This would rotate the shaft 145 and consequently move the crank 146 in one direction or the other, correspondingly turning the steering wheels. This differential gearing between the hand operated steering devices and the automatic steering devices is required to permit either of such devices to be operated independently of or in cooperation with the other to rotate the steering shaft 145.

Coming now to the automatic steering mechanism, it will be observed that if the arm 158 be swung in one direction or the other from the position shown in Fig. 19, i. e., a fore and aft position, it will rock the segmental gear 156, thereby rotating gear 155, and that if at the same time the worm gear 147 be held against rotation by the worm 143, the rotation of gear 155 will operate through pinions 150—151 to rotate cross-head 154 and thereby rotate steering shaft 145 to steer the front wheels. Consequently, without operating hand steering wheel 138 the machine may be steered by swinging arm 158 to one side or the other of the neutral position which it occupies as shown in Fig. 19. This swinging of the arm 158 in one direction or the other is accomplished by automatic mechanism which will now be described.

159 indicates a housing which is preferably, in part, formed integral with the housing 52, as shown in Fig. 6, but may be otherwise constructed. 160 indicates a shaft which is mounted in said housing in an approximately vertical position, as shown in said figure, and carries at its upper end above the housing a horizontal arm 161 as shown in Figs. 2 and 7. 162 indicates a rod connected with the outer portion of the arm 161 and extending forward to and connected with the rear end of the arm 158 as shown in Fig. 19. This connection is best made by providing the rod 162 with a forked coupling 163 secured upon it so that it may be adjusted longitudinally, said coupling having a pin 164 in the front portion thereof, which passes through a longitudinally-extending slot 165 in the rear portion of the arm 158, so that a little lost motion is provided for between the rods 162 and 158. As shown in Fig. 23, the fork of the coupling 163 is somewhat wider than the thickness of the arm 158, and a sleeve or roller 166 is mounted upon said pin underneath the rear end of the arm 158 to hold said arm up and also to provide an anti-friction bearing upon said pin below said arm. This roller is adapted to engage a V-shaped guide 167 which is mounted in a horizontal position on the top of the housing 144, in such manner as to have a limited lateral rocking movement, by means of an angularly-disposed stud 168 journaled in the housing 144, as shown in Fig. 23. The apex of the guide 167 is directed to the rear and occupies a position at one side or the other of a line connecting the rear pivot of the rod 162 and the shaft 157 as shown in Figs. 2 and 19. To limit the lateral movement of the guide 167 stops 169—170 are provided at opposite sides of said guide in position to engage the shoulders 171—172 at opposite sides of said guide. In the illustration of Fig. 19, the guide 167 is shown in engagement with the shoulder 169, whereas in Fig. 20 said guide is shown in the opposite position.

173 indicates a spring one end of which is connected to the guide 167 near the apex thereof by means of a pin 174, the opposite end of said spring being connected to a pin 175 at the underside of the arm 158 near the shaft 157, as best shown in Figs. 19, 20 and 23. 176—177 indicate pins in the upper surface of the housing 144 at opposite sides of the pivot 168 of the guide 167, to which pins the forward end of the spring 173 is adapted to be connected under certain operating conditions, as will be hereinafter more fully explained.

As will readily be understood from the foregoing explanation, if the parts are in the position shown in Fig. 19 and the rod 162 is moved forward endwise, the pin 164 will move forward in the slot 165 until the roller 166 engages the lower margin of the guide 167 as it appears in Fig. 19, whereupon continued forward movement of the rod 162 will cause the forward end of said rod to ride along such edge, thereby deflecting the arm 158 in a counterclockwise direction until finally it reaches the position shown in Fig. 20. This swinging of the arm 158 will turn the steering wheels in one direction, as has been described. At the same time the swinging of the arm 158 will move the forward end of the spring 173 into the position shown in Fig. 20, exerting a pull upon the apex of the guide 167 which will swing said guide into the position shown in Fig. 20. This position it will maintain after the arm 158 returns to its normal position, as the tension of the spring 173 even when largely relaxed is sufficient to hold it there. When the rod 162 is again moved forward, the guide 167 being then in the position shown in Fig. 20, the roller 166 will engage the opposite margin of said guide and consequently the forward end of the rod 162 will be swung in the opposite direction and will swing the arm 158 in a clockwise direction, thereby turning the front wheels so as to steer the machine in a direction opposite to that in which they would be turned by the first described movement of the arm 158. It will be seen, therefore, that with the spring 173 connected as shown in Figs. 19 and 20, successive forward movements of the rod 162 will swing the arm 158 alternately in opposite directions and consequently will steer the machine so that it turns alternately to the right and to the left. If it be desired to have the machine turn always in the same direction, the front end of the spring 173 is disconnected from the pin 175 and is connected to one or the other of the pins 176 or 177, as shown for example in Fig. 22. In the arrangement shown in the latter figure the arm 158 will always be swung in a counterclockwise direction because the spring 173, being connected to pin 176, will retain its position notwithstanding the swinging of the arm 158 and will hold the guide 167 in a fixed position. If the spring 173 were connected with the pin 177 it will be obvious the arm 158 would always swing in a clockwise direction, and the wheels be correspondingly steered. The object of providing for steering the machine as described is to adapt it for use either in cultivating along parallel lines,—i. e., down the rows in one direction and back in the opposite direction, which, of course, necessitates turning the machine first in one direction, as to the left, through an arc of 180 degrees, and then when the opposite end of the field is reached, turning it through a similar arc in the opposite direction,—or, if desired, to steer the machine in one direction across the field and then to turn either to the right or to the left at right angles to the previous direction. With the apparatus described any of these turns may be made, in each case the machine turning through a predetermined arc without manual guidance from the operator; but, as has been explained, the manually operated steering devices enable the operator to steer the machine altogether manually, or he may employ the manual steering devices in conjunction with or in modification of the action of the automatic steering devices.

The automatic steering devices are operated by power derived from the motor 72, which operates to move the steering rod 162 endwise through mechanism which is best shown in Figs. 6 to 12, and will now be described.

178 indicates an arm provided with a hub 179 which is loosely mounted on the shaft 160, as best shown in Fig. 12. The arm 178 is provided near its outer end with a downwardly projecting pin 180, and the hub 179 is provided on its lower face with teeth 181 so that said hub constitutes a clutch member. 182 indicates a similar arm which is also loosely mounted on the shaft 160 by means of a hub 183 provided on its upper face with teeth 184, constituting a second clutch member which is oppositely disposed to the clutch member 179. The arm 182 also carries near its outer end an upwardly projecting pin 185 which is arranged opposite to the pin 180. The two clutch members 179 and 183 are spaced a sufficient distance apart to receive between them a double faced clutch member 186 which is mounted on the shaft 160 so as to slide longitudinally thereon, upon a key 187, as shown in Fig. 12. Thus by sliding the intermediate clutch member 186 into engagement with the upper clutch member 179 the arm 178 will be locked to the shaft 160 so as to rotate therewith, and in like manner the arm 182 may be connected to rotate with the shaft 160 by moving the clutch member 186 down into engagement with the clutch member 183. For moving the clutch member 186 into engagement with one or the other of the clutch members 179—183, I provide a longitudinally-movable rod 188 which is slidably mounted in the housings 159 and 53 and is provided with a fork 189 having inwardly projecting pins which fit in a peripheral groove 190 in the clutch member 186, as shown in Fig. 12. For moving the rod 188 endwise for the purpose described it is provided at its upper end with a cam lever 191 which bears upon the upper surface of the housing 159, as shown in Fig. 6, and is arranged so that when turned to a horizontal position as shown in Fig. 7 the rod 188 will be in its lowermost position and the clutch member 186 will operatively engage the clutch member 183. By turning the lever 191 to a vertical position the clutch member 186 will be drawn up out of engagement with the clutch member 183 and into engagement with the clutch member 179.

The arm 178 is employed to rotate the shaft 160 when the automatic steering mechanism is employed to make a ninety degree turn, and the arm 182 is employed to rotate said shaft when the steering mechanism is to be automatically operated to make a turn of one hundred and eighty degrees. These results are accomplished by means of a cam disc 192, which, as best shown in Fig. 7, is mounted upon a shaft 193 mounted in the housings 53—159 parallel with the shaft 160. Said cam disc is keyed upon the shaft 193 so as to rotate therewith, and is provided on its upper surface with a cam groove 194 which has somewhat the shape of the figure 8, said groove being adapted to receive the downwardly projecting pin 180, as shown in Fig. 8. On its under surface the cam disc 191 is provided with a cam groove 195 which is in the form of a circle with a segment removed, as shown in Fig. 9, and is adapted to receive the upwardly projecting pin 185. By this construction, when the cam disc 192 is rotated it will operate to move the arm 178 laterally and hold it in its outermost position while said disc rotates through an arc of ninety degrees and will then move it inwardly to its normal position, the whole operation occurring during half a rotation of the disc 192. This will have no effect on the shaft 160 unless the arm 178 is operatively connected with said shaft by the clutch member 186, but if it be connected with said shaft the steering rod 162 will be moved forward to turn the steering wheels, which will be held in an angular position to the longitudinal axis of the machine long enough to make a ninety degree turn, when they will be straightened up again. At the same time the cam groove 195 operates to swing the arm 182 laterally, but differs in action from the cam groove 194 in that it holds the arm 182 in its outermost position long enough to make a turn of one hundred and eighty degrees, and consequently when the arm 182 is operatively connected with the shaft 160 by means of the clutch member 186, as described, the machine will automatically turn through an arc of one hundred and eighty degrees, after which the steering wheels will be straightened up again.

The shaft 193 is rotated to rotate the cam disc 192 for the purpose above described by means of a worm wheel 196, as best shown in Figs. 7 and 10. Said worm wheel is loosely mounted on the shaft 193 below the cam disc 192 and its lower face is provided with a series of ratchet teeth 197. Said worm wheel is operatively engaged by a worm 198 carried by a shaft 199 which alines with and is connected to the shaft 94, as shown in Fig. 15. These shafts may if desired be made integral with each other, but the construction shown is preferable. Thus the worm 198 and the worm wheel 196 are always driven from the transmission shaft 87 when any one of the speed gears is in operative engagement with its co-acting gear, but under normal conditions, as when the machine is being driven across the field, the worm wheel 196 turns idly on the shaft 193. For connecting the worm wheel 196 operatively to the shaft 193 a ratchet wheel 200 is provided which is mounted on a keyway on the shaft 193 so that it may be moved up into engagement with the ratchet teeth 197 of the worm wheel 196, as best shown in Fig. 7. Obviously, when the ratchet wheel 200 operatively engages the worm wheel 196 said worm wheel will operate to rotate the shaft 193 and with it the cam disc 192. The ratchet wheel 200 is moved up into engagement with the worm wheel 126 by means of a finger 201 carried by a rock-shaft 202 mounted in the housing 53, as shown in Figs. 7 and 11, said finger being disposed under the ratchet wheel 200 and so arranged that when the shaft 202 is rocked in a counterclockwise direction, as viewed in Fig. 11, said finger will operate to lift the ratchet wheel 200 into engagement with the worm wheel 196, as indicated by dotted lines in said figure. The rock-shaft 202 is arranged to be rocked by the operator for the purpose described, by means of a foot lever 203, as shown in Fig. 6. Said foot lever is pivoted at 204 and is provided with an arm 205 connected by connecting rod 206 with a bell-crank lever 207, as shown in dotted lines in Fig. 6. The latter lever is connected by a rod 208 with an arm 209 carried by the rock-shaft 202. Thus by depressing the foot lever 203 the rock-shaft 202 will be rocked to cause the ratchet wheel 200 to engage the worm wheel 196, and thereby cause the shaft 193 to rotate.

In order to hold the ratchet wheel 200 up in operative position while it makes either a complete rotation or a half of a complete rotation, said ratchet wheel is provided on its under surface near its periphery with a lug 210, as shown in Figs. 7 and 11. Said lug normally lies in a recess 211 in the housing 53, but when the ratchet wheel 200 is moved up into operative engagement with the worm wheel 196 and begins to rotate the lug 210 rests upon the upper surface of the housing 53 and rides around on such surface, thereby holding the ratchet wheel up in operative position. When the lug 210 reaches a position diametrically opposite to that shown in Fig. 7 it reaches a recess or opening 212 in the housing 53, best shown in Fig. 7, and unless prevented will drop into such recess, thereby permitting the ratchet wheel 200 to drop out of engagement with the worm wheel 196 and stopping the shaft 193 after it has made one-half of a complete rotation, as is the case when a ninety degree turn is wanted. If, however, a turn of one hundred and eighty degrees is desired, it is necessary to bridge over the recess 212 so that the lug 210 will pass over said recess without dropping into it and will continue to hold up the ratchet wheel 200 until it has made a complete rotation, by which time the lug 210 will have arrived at the recess 211 and will drop thereinto. For bridging over the recess 212 I provide a plate or bar 213 shown in Fig. 7, which projects laterally from a rod 214, mounted in the housing to slide longitudinally therein in much the same way as the rod 188. The rod 214 is provided at its upper end with a cam lever 215 similar to the cam lever 191, so that by operating said cam lever the rod 214 may be drawn up to carry the bar 213 into position to bridge over the recess 212. A spring 216 is preferably provided on the rod 214 for normally holding the bar 213 down out of operative position.

From the foregoing description, it is believed that it will be clear that if the operator wants to set his steering mechanism so as to make successive ninety degree turns always in the same direction he must swing the lever 215 over to the left from the position shown in Fig. 7 so as to lower the bar 213 out of operative position. He must also move the lever 191 in the same direction for the purpose of moving clutch member 186 into engagement with the clutch member 179 and thereby operatively connect arm 178 with shaft 160. These adjustments being made, when the operator depresses foot lever 203 the ratchet wheel 200 will be moved up into engagement with worm wheel 196, whereupon the shaft 193 and cam disc 192 will be rotated. The rotation of said cam disc will swing arm 178 laterally and hold it in such position until the cam disc moves through an arc of ninety degrees when said arm will be moved in again to its former position, at which time the lug 210 carried by the ratchet wheel 200 will drop into recess 212, thereby disengaging said ratchet wheel from the worm wheel 196 and stopping the shaft 193 and arm 178. The movement of the arm 178 just described will swing arm 161 forward, which will move rod 162 in the same direction and swing arm 153 either to the right or to the left, depending upon the position of guide 167, which under the conditions recited will be held in a fixed position by the spring 173, the forward end of which will be attached either to the pin 176 or the pin 177, depending upon the direction in which the turn is to be made. When turns of one hundred and eighty degrees are made they must obviously be made alternately in opposite directions, and in that case the forward end of the spring 173 is connected to the pin 175 carried by arm 158, as shown in Figs. 19, 20 and 21. In this case the levers 191 and 215 are turned to the position shown in Fig. 7, so that clutch member 186 is in engagement with clutch member 184 and bar 213 is up in operative position as shown in said figure. Then when the point where the turn is to be made is reached the operator depresses lever 203 to move ratchet wheel 200 into engagement with worm wheel 196. The rotation of cam disc 192 thus effected swings arm 182 laterally and again moves steering rod 162 forward holding it there long enough to make the desired turn. When this sort of turn is made the arm 158 will swing in opposite directions from its neutral position on successive turns, owing to the fact that the guide 167 will be shifted alternately from the position shown in Fig. 19 to the position shown in Fig. 21, as has been described.

In order that my improved machine will be adapted for use with implements, such as check row corn planters, in which it is necessary to stop the machine after making a turn in order to replace the check row wire, I have provided means by which when the turn is completed the machine is automatically stopped. The mechanism for this purpose is best shown in Figs. 2, 6, and 26 to 30. Referring to said figures, 217 indicates a connecting rod which is pivoted at its forward end to the arm 161 and is provided at its rear end with a longitudinal slot 218. 219 indicates a bar which is pivoted at 220 to a link 221 mounted upon a pivot 222 at one side of the housing 52, as shown in Figs. 2 and 26. The upper end of said bar is provided with a laterally projecting pin 223 which extends through the slot 218, and the lower end of said bar is under certain conditions adapted to bear against the lug 83, as shown in dotted lines in Fig. 27 and in full lines in Fig. 28. 224 indicates a block which is also mounted on the pivot 222 and is provided with a stop plate 225, as best shown in Fig. 30. The block 224 is connected by a connecting rod 226 with the clutch lever 78, preferably at the base of the pedal 80, as shown in Figs. 26 to 29, and for this purpose I provide a plate 227 formed with or connected to said pedal, and provided with a slot 228 to receive the rear end of a connecting rod 226, which is bent laterally for that purpose, as shown at 229. Thus a certain amount of lost motion is provided for between the pedal 80 and the connecting rod 226. 230 indicates a spring, connected with the plate 227 and to a collar 231 mounted on the connecting rod 226 which tends to pull back on the connecting rod 226, and hold the rear end thereof at the rear end of the slot 228. 232 indicates a fixed stop carried by the housing 52, which is adapted to be engaged by a bevel surface 233 of the block 224.

The position of the parts just described when the machine is traversing a field in a straight line, is shown in Fig. 26, the pin 223 being then at the forward end of the slot 218, and the bar 219 being up out of operative position, with the block 224 in engagement with the stop 232. The rear end of the connecting rod 226 is then at the forward end of the slot 228 and the clutch lever 78 is in the position which it normally occupies when the machine is travelling. When the arm 161 is moved forward to operate the steering mechanism it will be apparent that the connecting rod 217 will be carried forward with it, but during the first part of the forward movement of said connecting rod it will not actuate the bar 219 owing to the lost motion provided for by the slot 218. When the rear end of said slot reaches the pin 223, further forward movement of the connecting rod 217 will move the upper end of the bar 219 forward, and this will rock the link 221 about the pivot 222 so that the bar 219 will swing down to the position shown in dotted lines in Fig. 27. The link 221 will then rest on the plate 225, which limits its further downward movement, and the lower end of the bar 219 will lie back of and adjacent to the lug 83, as there shown. When the turning movement has been completed and the arm 161 moves back toward its normal position, the link 217 will be carried back with it until the forward end of the slot 218 reaches the pin 223, whereupon further rearward movement of the link 217 will rock the bar 219 in a clockwise direction about its pivot 220, thereby moving its lower end forward into engagement with the lug 83. As this movement continues, the collar 82 will be moved forward thereby operating the lever 78 to disconnect the main clutch and stop the propeller shaft 84, thereby stopping the traction wheels. The parts will then be in the position shown in Fig. 28, the block 224 being in engagement with the stop 232 and the rear end of the connecting rod 226 being at the rear end of the slot 228. To start the machine again the operator presses forward on the pedal 81, thereby moving the clutch lever 78 a short distance further forward and also rocking the block 224 about the pivot 222 so as to swing the link 221 upward to the position shown in Fig. 29, where it is engaged by the stop 232. When the operator releases the pedal 81 the clutch lever 78 will return to its operative position and the other parts will resume the position shown in Fig. 26. Thus it will be seen that upon the completion of the turning movement the machine will be automatically stopped and the main clutch will be held out of operative position until the operator releases it by pressing forward on the pedal 81.

In Figs. 1 and 2 I have shown my improved machine rigged as a three-row corn planter, 234—235—236 indicating three corn planter rigs connected to the frame 41 by draft bars 237—238—239, respectively, as shown in Fig. 2. Said rigs are set equally distant apart, one outside each of the traction wheels and one in the central line of the machine. These planter rigs individually may be of any approved type so far as my invention generically considered is concerned, but I prefer to employ planter mechanisms having certain improvements which especially adapt them for use in a tractor propelled machine, and particularly one propelled by traction wheels located back of the planting devices. The several planters are flexibly connected together by hinged or flexibly joined cross-bars 237$^a$—237$^b$, and 238$^a$, 238$^b$, as shown in Fig. 2, so that one of the outer planters, as 234, may move vertically independently of the other planters and thus give the planter frame considered as a whole a certain amount of flexibility which enables the planters to accommodate themselves to inequalities of the ground. As shown in Figs. 1 and 2, my improved planting devices comprise furrow openers 240 arranged in advance of oppositely-disposed covering discs 241—242, behind which are arranged two presser discs 243—244 mounted upon a common axis 245 and spaced a short distance apart, as shown in Fig. 2. Said presser discs are provided with rather broad V-shaped rims, the inner portions of which are slightly concave, and the two discs of each pair are arranged to operate at opposite sides of the seed deposited in the hills, with the result that the earth is rounded over the hills and shallow trenches 246 are formed at opposite sides thereof as shown in Fig. 4. Thus the seed is uniformly covered and sunlight is permitted to reach it. Also the trenches permit moisture to reach the roots more easily, and facilitate proper cultivation as the dirt thrown by the cultivator shovels fills in the trenches and builds up more uniformly over the hills. By employing three cultivator rigs arranged as described, the steering and traction wheels travel between the corn rows, and consequently the soil over the seed is not firmly packed down, as would be the case if the wheels ran over the hills. The relative position of the wheels and rows is illustrated in Figs. 4 and 5, the latter figure showing how the wheels run on the ridges between rows where the corn has been listed.

In planting or cultivating a field with my improved machine, it is, of course, necessary that the tillage implements be raised out of operative position at the turns, and this also is accomplished automatically. For this purpose I provide a rock-shaft 247 which extends transversely of the frame of the machine, as shown in Fig. 2, and is provided with three rearwardly projecting arms 248—249—250, as shown in said figure. It is also provided near its longitudinal center with an upwardly projecting crank arm 251 which is connected by a connecting rod 252 with the horizontal arm 161. Thus when the latter arm swings forward in steering the machine the shaft 247 will be rocked to carry the arms 248—249—250 upward. 253—254—255 indicate rods pivotally connected respectively to the rear portions of the corn planter frames 234—235—236. As best shown in Figs. 1 and 2, such rods are connected with the arms 248—249—250, respectively, by means of collars 256 fitted loosely on the reduced upper ends of said rods and held in place by cotter pins or other suitable means. Below the collars 256 are springs 257 mounted on said rods which tend to press the corn planter frames downward, as best shown in Fig. 1. By this construction, when the shaft 247 is rocked in a clockwise direction, as viewed in Fig. 1, the three corn planter frames will be raised and held up out of operative position, and they will be lowered again when the shaft 247 is returned to its normal position by the backward movement of the arm 161, which as has been described straightens up the steering wheels.

The usual rotary corn planter seed plates are driven from the shaft 87 by means of an extensible shaft comprising a tubular member 258 and a member 259 telescoping therein, as shown in Fig. 31. These two members are operatively connected by means of a coupling 260 secured on the lower end of the member 258, and provided with a spring-pressed dog 261 which engages a longitudinal groove 262 in the member 259, which groove at its lower end runs out to the surface of the member 259. By this arrangement the member 259 can be moved up into the member 258 without operatively disconnecting them until the dog 261 runs out of the groove 262, when the member 258 can rotate freely without rotating the member 259. The member 258 is provided at its upper end with a bevel gear 263 which meshes with a bevelled pinion 264 carried by the shaft 87, the parts being enclosed in a housing 265, as shown in Figs. 2 and 31. The member 258 will, therefore, be constantly driven while the shaft 87 is rotating, and the member 259 will also be driven so long as the dog 261 remains in the groove 262, but will be capable of moving longitudinally with reference to the member 258. As indicated in Fig. 2, the member 259 is provided at its lower end with a bevel pinion 266 which meshes with a bevel gear 267 carried by a transverse shaft 268, which corresponds with the usual drive shaft of a corn planter and operates to drive the several seed plates, either directly through ordinary gearing, or through the instrumentality of a clutch controlled by the usual check row forks, depending on whether the machine is to be used as a drill or as a check row planter. Where the machine is used as a drill, the length of the slot 262 is such that the dog 261 runs out of said slot when the corn planting devices are raised out of operative position, and this arrangement may also be used with check row planters, although in the latter case it is not essential that the members 258—259 be operatively disconnected when the planting devices are raised, as the rotation of the seed dropping devices is controlled by the check row forks and the shaft 268 would in that case normally rotate idly.

In check row planting it is necessary to disconnect the check row wires before making a turn, and in my improved machine this also is accomplished automatically. Referring particularly to Figures 1, 2 and 32 to 36, 269 indicates the usual check row wires, provided with buttons 270. 271 indicates the usual rock-shaft which extends transversely of the machine and carries the usual check row forks 272 arranged to be operated by the buttons 270. 273—274 indicate the usual pairs of spools for guiding the check row wire. As best shown in Figs. 32 and 35, each pair of spools is mounted in a frame 275 which extends longitudinally of the machine, one being provided at each side of the machine as shown in Fig. 2. Said frames are mounted on pivots 276 so that said spools may be turned from a vertical to a horizontal position to release the check row wire. Each of said frames is normally held in operative position by means of a spring-operated latch 277 which engages the inner margin 278 of the frame 275, as shown in Fig. 35. When said latch is operated to release the frame 275 the frame can swing in a counterclockwise direction as viewed in Fig. 35, thereby releasing the check row wire. Preferably in connection with the spools 273—274 I employ fingers 279 to prevent accidental disengagement of the check row wire with the spools, as shown in Figs. 32 and 35. The latches 277 at opposite sides of the machine are automatically operated to release the frames 275, when the corn planting devices are raised out of operative position, by means of rods 280—281 which are connected to opposite ends of a cross-head 282 mounted upon a pivot 283 carried by a bracket 284 mounted on a transverse bar 285 which connects the several corn planter frames, as shown in Figs. 2 and 35. Said cross-head 282 is provided with a laterally projecting arm 286, shown in Figs. 35 and 36, which extends through a slot 287 in a bar 288 which depends from the main frame 41. Thus when the corn planting devices are raised out of operative position the arm 286, after reaching the upper end of the slot 287 is actuated to release the latches 277 and disconnect the check row wires. The slot 287 is provided so that the disconnection of the check row wires will occur shortly after the lifting operation has commenced. In order to lock the check row forks 272 out of operative position when the machine is used for drilling, I provide the shaft 271 with a bracket 289 which carries a pin 290, as shown in Figs. 33 and 34. Said pin is adapted to be engaged by a notch 291 in a latch bar 292 pivoted to a bracket 293 carried by the cross-bar 285, as shown in Figs. 2 and 33. Normally in check rowing the pin 290 swings over the latch bar 292, which then rests on the hub of the bracket 289 and is adapted to extend through it as illustrated in Fig. 34. By lifting the latch bar 292 and swinging the shaft 271 to the proper position, the notch 291 may be fitted upon the pin 290, thereby holding the rock-shaft 271 stationary.

In operating the machine above described, it is important, especially in cultivating, that the operator be provided with a guide by means of which he may steer the machine accurately along the rows, and I have, therefore, provided an automatically controlled guide for that purpose. As illustrated in Figs. 1, 2 and 3, the guiding devices comprise two double convex discs 293—294 mounted in forks 295 carried at the lower ends of rods 296—297, which at their upper ends are fitted in vertical bearings in sleeves 298—299 mounted upon horizontal shafts 300—301 which extend from the end portions of the frame bars 42—43, as best shown in Figs. 2 and 3. Thus the discs 293—294 may swing laterally. They may also be raised and lowered by rocking the sleeves 298—299. In order that the discs 293—294 may swing in unison, the rods 296—297 are provided with rearwardly extending arms 302—303 which are connected by a transverse bar 304, as shown in Figs. 2 and 3, and for the purpose of providing the operator with an indicator by which he may accurately guide the machine, said bar is provided with an upwardly projecting arm 305, as shown in Fig. 3. This arm is best placed so that when the rods 296—297 are parallel with the longitudinal axis of the machine the arm 305 will lie under one of the side beams of the frame 41, as shown in Fig. 3, and consequently lateral movement of the discs 293—294 in either direction will be at once manifest to the operator. The discs 293—294 are preferably located so that they run midway between two rows.

In turning it is desirable that the discs 293—294 be lifted out of operative position, and to accomplish this automatically the sleeves 298—299 are provided with upwardly-extending arms 306—307 which respectively connect with the arms 248—250 by rods 308—309, as shown in Figs. 1 and 2, the arrangement being such that when the rock-shaft 247 is rocked to raise the corn planter frames as has been described, the rods 308—309 will be moved endwise in a forward direction, thereby rocking the sleeves 298—299 and lifting the discs 293—294 out of operative position. The connection between the rods 308—309 and the arms 248—250 is made by means of sleeves 310 fitted upon said rods and pivoted upon brackets 311 mounted upon the arms 248—250, as best shown in Fig. 1. Stops 312 are provided on the rods 308—309 in front of the sleeves 310 so that when the rock-shaft 247 is rocked in a clockwise direction, as viewed in Fig. 1, the sleeves 310 will bear against the stops 312 and move the rods 308—309 forward. In order to yieldingly hold the discs 293—294 down on the ground, springs 313 are provided upon the rods 308—309 between the sleeves 310 and collars 314 fitted upon the rear ends of the rods 308—309 and held in place by cotter pins or in any other suitable way. Thus said springs operate to draw back on the rods 308—309 and consequently exert downward pressure on the discs 293—294.

In Figs. 37 and 40 I have shown the front part of my improved machine with disc cultivator rigs 315 substituted for the corn planter rigs shown in Figs. 1 and 2, and in Figs. 38 and 39 I have illustrated the application of shovel cultivator rigs 316 to the machine. In order to substitute either of the styles of cultivator rigs shown in place of the corn planter rigs no changes in the machine are necessary other than the omission of such parts as have especially to do with the operation of the machine as a corn planter, as, for example, the omission of the mechanism for driving the seed dropping mechanism and the mechanism for throwing off the check row wire. I prefer, however, to employ chains 317 for connecting the arms 250 to the cultivator rigs, as shown in Figs. 37 to 40, instead of using the rods 255 shown in Fig. 1, and, if desired, the shaft 247 may be located further forward, as shown in Fig. 38. When used as a cultivator the machine is operated in the manner described, the cultivator rigs being raised and held up out of operative position at the turns and lowered into operative position when the turn is completed in the same way as described in connection with the corn planter mechanism. The stoppage of the machine after completing a turn is, however, unnecessary when cultivating, and, therefore, it is desirable to put the automatic stopping mechanism out of service in such circumstances, which may be readily accomplished by disconnecting the bar 217, or the bar 219, or by moving the collar 82 out of position to cooperate with the bar 219.

In order to provide a low hitch for the tilling devices while at the same time the frame will be high enough to clear the plants, I provide brackets 318 depending from the front of the main frame and also from the lateral extensions 42—43 thereof, as shown in Figs. 1, 2, 39 and 40, and the tilling devices are connected with the lower ends of these brackets as shown in said figures. It will also be noted that, as shown in Fig. 1, the differential gearing and the change speed gearing is located at the opposite side of the machine from the motor 72, as shown in Fig. 2, thus approximately equalizing the weight of both sides of the machine so that the traction obtained is more nearly uniform.

While many of the features of the invention hereinbefore described are peculiarly pertinent to the operation of soil tilling implements, which term is herein used as comprehending corn or other planters, cultivators, &c., many of them may also be employed to advantage in a power propelled vehicle designed for other uses, and various other forms of implements may be substituted for those described. Therefore, the claims hereinafter made as defining my invention should not be construed as being limited to a machine having the specific embodiment shown and described, except in so far as such claims are directed specifically to such construction. The term "cornplanter" as herein used is intended to include equivalent devices for planting various other kinds of seeds.

What I claim as my invention and desire to secure by Letters Patent, is—

1. A vehicle comprising a suitable frame, supporting and steering wheels therefor, a motor, mechanism operated by said motor for steering the vehicle, and manually-operated means operatively connected with said mechanism and operable independently of said motor to vary the extent to which the steering wheels are turned by the operation thereof.

2. An implement comprising a suitable frame, wheels supporting said frame, a motor, mechanism operated by said motor for steering the implement, and means operatively connected with said mechanism and adapted to be operated either to steer the implement independently of the operation of said motor or to vary th operation of said mechanism when actuated by said motor.

3. A vehicle comprising a suitable frame having propelling and steering wheels, a motor, means for driving said propelling wheels from said motor, mechanism operated by said motor for steering said steering wheels, and manually operated means operatively connected with said mechanism and operable independently of said motor to vary the extent to which the steering wheels are turned by the operation thereof.

4. An implement comprising a suitable frame having propelling and steering wheels, a motor, means for driving said propelling wheels from said motor, mechanism operated by said motor for steering said steering wheels, and means operatively connected with said mechanism and adapted to be operated either to steer the implement independently of the operation of said motor, or to vary the operation of said mechanism when actuated by said motor.

5. An implement comprising a suitable frame having propelling wheels at the rear and steering wheels at the front, a motor, means operated by said motor for driving said propelling wheels, mechanism operated by said motor for steering said steering wheels, and manually operated means operatively connected with said mechanism and adapted to be operated either to steer said steering wheels independently of the operation of said motor or to vary the operation of said mechanism when actuated by said motor.

6. An implement comprising a suitable frame, wheels supporting said frame, a motor, mechanism adapted to be actuated by said motor for turning the implement in a predetermined arc, and means adapted to be operated by an operator on the implement to connect said mechanism with the motor.

7. An implement comprising a suitable frame having dirigible front wheels, a motor, mechanism operated by said motor for turning said dirigible wheels to steer the implement in a predetermined arc, and means adapted to be operated by an operator on the implement to connect said mechanism with the motor.

8. An implement comprising a suitable frame having propelling and steering wheels, a motor, means operated by said motor for driving said propelling wheels, mechanism adapted to be actuated by said motor for turning said steering wheels to steer the implement in a predetermined arc, and means adapted to be operated by an operator on the implement to connect said mechanism with the motor.

9. An implement comprising a suitable frame, wheels supporting said frame, a motor, means operated by said motor for turning the implement in a predetermined arc, and means for steering the implement independently of the operation of said motor.

10. An implement comprising a suitable frame, wheels supporting said frame, a motor, mechanism operated by said motor for turning the implement in a predetermined arc, and means operatively connected with said mechanism and operable independently of said motor to steer the implement.

11. An implement comprising a suitable frame, wheels supporting said frame, a motor, mechanism operated by said motor for turning the implement in a predetermined arc, and means operatively connected with said mechanism and adapted to be operated either to steer the implement independently of the operation of said motor or to vary the operation of said mechanism when actuated by said motor.

12. An implement comprising a suitable frame having propelling and steering wheels, a motor, means operated by said motor for driving said propelling wheels, mechanism operated by said motor for turning said steering wheels to steer the implement in a predetermined arc, and means operatively connected with said mechanism and adapted to be operated to steer said steering wheels independently of the operation of said motor.

13. An implement comprising a suitable frame having propelling and steering wheels, a motor, means operated by said motor for driving said propelling wheels, mechanism actuated by said motor for turning said steering wheels to steer the implement in a predetermined arc, and means operatively connected with said mechanism and adapted to be operated either to steer the implement independently of the operation of said motor or to vary the operation of said mechanism when actuated by said motor.

14. An implement comprising a suitable frame, wheels supporting said frame, a motor, means operated by said motor for turning the implement in either direction in a predetermined arc, and means for steering the implement independently of the operation of said motor.

15. An implement comprising a suitable frame, wheels supporting said frame, a motor, mechanism operated by said motor for turning the implement in either direction, and means operatively connected with said mechanism and adapted to be operated either to steer the implement independently of said motor or to vary the operation of said mechanism when actuated by said motor.

16. An implement comprising a suitable frame, wheels supporting said frame, a motor, mechanism operated by said motor for turning the implement in a predetermined arc, and means operatively connected with said mechanism and adapted to be operated while the implement is in motion, for varying the extent to which the implement is turned by said motor-operated means.

17. An implement comprising a suitable frame, wheels supporting said frame, a motor, mechanism operated by said motor for turning the implement in either direction in a predetermined arc, and means operatively connected with said mechanism and adapted to be operated while the implement is in motion, for varying the extent to which the implement is turned by said motor-operated means.

18. An implement comprising a suitable frame, wheels supporting said frame, a motor, means operated by said motor for turning the implement alternately in opposite directions, and means controlled by an operator on the implement for connecting said mechanism with or disconnecting it from the motor.

19. An implement comprising a suitable frame, wheels supporting said frame, a motor, mechanism operated by said motor for steering the implement, means controlled by an operator on the implement for connecting said steering mechanism with or disconnecting it from the motor, and means independent of said motor and connected with said steering mechanism for varying the operation thereof.

20. An implement comprising a suitable frame, wheels supporting said frame, a motor, means operated by said motor for propelling the implement, power operated means for steering the implement, and means controlled by said steering means for automatically stopping the implement.

21. An implement comprising a suitable frame having steering wheels, a motor, means operated by said motor for steering said wheels to turn the implement, and means for automatically stopping the implement when it has made a turn.

22. An implement comprising a suitable frame having propelling and steering wheels, a motor, means operated by said motor for driving said propelling wheels, means operated by said motor for steering said steering wheels to turn the implement, and means for automatically stopping the implement when it has made a turn.

23. An implement comprising a suitable frame, wheels supporting said frame, a motor, means operated by said motor for propelling the implement, power operated means for steering the implement, means controlled by said power operated steering means for automatically stopping the implement, and manually operated means for steering the implement.

24. An implement comprising a suitable frame having steering wheels, a motor, means operated by said motor for steering said wheels to turn the implement, means for automatically stopping the implement when it has made a turn, and means adapted to be operated independently of the actuation of said motor operated steering means to steer the implement.

25. An implement comprising a suitable frame having propelling and steering wheels, a motor, means operated by said motor for driving said propelling wheels, means operated by said motor for steering said steering wheels to turn the implement, means for automatically stopping the implement when it has made a turn, and means for steering the implement independently of the actuation of said motor operated steering means.

26. An implement comprising a suitable frame, wheels supporting said frame, means operated by said motor for propelling the implement, power operated means for steering the implement, means controlled by said steering means for automatically stopping the implement, and means adapted to be operated either independently of or in conjunction with said power operated means for steering the implement.

27. An implement comprising a suitable frame, wheels supporting said frame, means operated by said motor for propelling the implement, power operated means for steering the implement, means controlled by said steering means for automatically stopping the implement, and means adapted to be operated in conjunction with said power operated means for steering the implement.

28. An implement comprising a suitable frame having steering wheels, a motor, means operated by said motor for steering said wheels to turn the implement, means for automatically stopping the implement when it has made a turn, and means adapted to be manually operated in conjunction with said motor operated means for steering the implement.

29. An implement comprising a suitable frame having steering wheels, a motor, means operated by said motor for steering said wheels to turn the implement, means for automatically stopping the implement when it has made a turn, and means adapted to be manually operated either independently of or in conjunction with said motor operated means for steering the implement.

30. An implement comprising a suitable frame having steering wheels, a motor, means operated by said motor for steering said wheels, manually operated means for steering said wheels, and differential gearing connecting said motor operated and said manually operated steering means with said steering wheels, whereby said manually operated steering means may be employed to modify the operation of said motor operated steering means.

31. An implement comprising a suitable frame having steering wheels, a motor, steering means normally disconnected from said motor and adapted to be operated thereby to steer said wheels, means adapted to be actuated to operatively connect said motor with said steering means, means for automatically disconnecting the motor from said steering means after a predetermined turning movement, and manually operated means for steering said steering wheels.

32. An implement comprising a suitable frame having steering wheels, a motor, steering means normally disconnected from said motor and adapted to be operated thereby to steer said wheels, means adapted to be actuated to operatively connect said motor with said steering means, means for automatically disconnecting the motor from said steering means after a predetermined turning movement, means for varying such predetermined turning movement, and manually operated means for steering said steering wheels.

33. A vehicle comprising a suitable frame having dirigible wheels, a rod movable endwise of said frame and operatively connected with said dirigible wheels for steering the same, power operated means for moving said rod endwise, and means for controlling the direction in which the dirigible wheels are turned by endwise movement of said rod, said controlling means being adjustable to change the direction in which said wheels are turned.

34. A vehicle comprising a suitable frame having dirigible wheels, an endwise movable rod operatively connected with said dirigible wheels for steering the same, power operated means for moving said rod endwise, and a rocking guide cooperating with said rod to control the direction in which said wheels are turned by endwise movement of said rod.

35. A vehicle comprising a suitable frame having dirigible wheels, an endwise movable rod operatively connected with said dirigible wheels for steering the same, power operated means for moving said rod endwise, a rocking guide cooperating with said rod to control the direction in which said wheels are turned by endwise movement of said rod, and means for actuating said guide to cause the wheels to turn in opposite directions on alternate operations of said rod.

36. A vehicle comprising a suitable frame having dirigible wheels, an endwise movable rod operatively connected with said dirigible wheels for steering the same, power operated means for moving said rod endwise, a rocking guide cooperating with said rod to control the direction in which said wheels are turned by endwise movement of said rod, and a spring connected with said guide and adjustable to vary the action thereof.

37. A vehicle comprising a frame having dirigible wheels, power operated mechanism for steering said wheels, manually operated mechanism for steering said wheels, and differential mechanism interposed between said steering mechanisms and said wheels.

38. A vehicle comprising a frame having dirigible wheels, a shaft connected with said wheels and adapted by its rotation to steer the same, power operated mechanism for rotating said shaft, manually operated mechanism for rotating said shaft, and differential gearing connecting said power operated mechanism and said manually operated mechanism with said shaft.

39. A vehicle comprising a frame having dirigible wheels, a shaft connected with said wheels and adapted by its rotation to steer the same, a pinion loosely mounted on said shaft, power operated means operatively connected with said pinion for rotating the same, a worm wheel loosely mounted on said shaft, manually operated steering means operatively connected with said worm wheel for rotating the same, and gearing interposed between said pinion and said worm wheel and operatively connected with said shaft whereby said shaft may be rotated either by said power operated means or by said manually operated means.

40. A vehicle comprising a frame having dirigible wheels, a shaft, power operated means for rotating said shaft, means operated by the rotation of said shaft for steering said wheels, means for connecting said shaft with said power operated means, and means operating to disconnect said shaft from said power operated means after it has rotated to a predetermined extent.

41. A vehicle comprising a frame having dirigible wheels, a shaft, power operated means for rotating said shaft, means operated by the rotation of said shaft for steering said wheels, ratchet mechanism for connecting said shaft with said power operated means, and means operating to disconnect said shaft from said power operated means after it has rotated to a predetermined extent.

42. A vehicle comprising a frame having dirigible wheels, a shaft, power operated means for rotating said shaft, means operated by the rotation of said shaft for steering said wheels, manually operated means for connecting said shaft with said power operated means, and means operating to disconnect said shaft from said power operated means after it has rotated to a predetermined extent.

43. A vehicle comprising a frame having dirigible wheels, a shaft, power operated means for rotating said shaft, means operated by the rotation of said shaft for steering said wheels, means for connecting said shaft with said power operated means, means operating to disconnect said shaft from said power operated means after it has rotated to a predetermined extent, and means for varying the extent to which said shaft is rotated.

44. A vehicle comprising a frame having dirigible wheels, a shaft, power operated means for rotating said shaft, a rock shaft, an arm carried by said rock shaft, means operatively connecting said arm with said wheels and operating to steer the same by the swinging of said arm, and means operating by the rotation of said first-mentioned shaft to rock said rock shaft.

45. A vehicle comprising a frame having dirigible wheels, a shaft, power operated means for rotating said shaft, a rock shaft, an arm carried by said rock shaft, means operatively connecting said arm with said wheels and operating to steer the same by the swinging of said arm, and cam mechanism operating by the rotation of said first-mentioned shaft to rock said rock shaft.

46. A vehicle comprising a frame having dirigible wheels, a shaft, power operated means for rotating said shaft, a rock shaft, an arm carried by said rock shaft, means operatively connecting said arm with said wheels and operating to steer the same by the swinging of said arm, cam mechanism operating by the rotation of said first-mentioned shaft to rock said rock shaft, and means for operatively connecting said rock shaft with or disconnecting it from said cam mechanism.

47. A vehicle comprising a frame having dirigible wheels, a shaft, power operated means for rotating said shaft, a rock shaft, an arm carried by said rock shaft, means operatively connecting said arm with said wheels and operating to steer the same by the swinging of said arm, a plurality of cams operated by the rotation of said first-mentioned shaft, and means for operatively connecting said rock shaft with or disconnecting it from either of said cams.

48. A vehicle comprising a suitable frame having propelling and dirigible wheels, a motor, clutch mechanism for connecting said motor with said propelling wheels, power operated mechanism for steering said dirigible wheels, and means actuated by said steering mechanism for disconnecting said clutch mechanism.

49. A vehicle comprising a frame having propelling and dirigible wheels, a motor, clutch mechanism for connecting said motor with said propelling wheels, a rock-shaft, power operated means for rocking said rock-shaft, an arm carried by said rock-shaft, means operatively connecting said arm with said dirigible wheels and operating to steer the same by the swinging of said arm, and means actuated by said arm for disconnecting said clutch mechanism.

50. A vehicle comprising a suitable frame having propelling and dirigible wheels, a motor, means for driving said propelling wheels from said motor comprising a shaft driven by said motor, change speed gears carried thereby, a countershaft, gears carried by said countershaft and cooperating with said first-mentioned gears, and differential gearing driven from said countershaft and connected with said propelling wheels, mechanism for steering said dirigible wheels, and means driven by said countershaft for actuating said steering mechanism.

CHARLES E. WHITE.